US009542666B2

(12) United States Patent
Alfredson

(10) Patent No.: US 9,542,666 B2
(45) Date of Patent: *Jan. 10, 2017

(54) COMPUTER-IMPLEMENTED SYSTEM AND METHODS FOR DISTRIBUTING CONTENT PURSUANT TO AUDIT-BASED PROCESSES

(71) Applicant: WOLTERS KLUWER UNITED STATES INC., Riverwoods, IL (US)

(72) Inventor: Glen Stewart Alfredson, Raleigh, NC (US)

(73) Assignee: CCH INCORPORATED, Riverwoods, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,101

(22) Filed: Mar. 5, 2014

(65) Prior Publication Data

US 2014/0188943 A1 Jul. 3, 2014

Related U.S. Application Data

(63) Continuation of application No. 13/191,494, filed on Jul. 27, 2011, now Pat. No. 8,706,773.

(60) Provisional application No. 61/368,214, filed on Jul. 27, 2010.

(51) Int. Cl.
*G06F 17/30* (2006.01)
*G06Q 10/10* (2012.01)

(52) U.S. Cl.
CPC ............ *G06Q 10/10* (2013.01); *G06Q 10/103* (2013.01)

(58) Field of Classification Search
None
See application file for complete search history.

(56) References Cited

U.S. PATENT DOCUMENTS

| 2001/0029475 A1 | 10/2001 | Boicourt |
| 2003/0144930 A1 | 7/2003 | Kulkarni |
| 2009/0048978 A1 | 2/2009 | Ginter |
| 2009/0106254 A1 | 4/2009 | Mccoy |
| 2009/0112741 A1 | 4/2009 | Kershner |
| 2009/0113324 A1 | 4/2009 | Spradling |
| 2009/0157667 A1 | 6/2009 | Brougher |

OTHER PUBLICATIONS

"Risk Assessment Standards (Nos. 104-111) Resource Center" (http://www.aicpa.org/InterestAreas/EmployeeBenefitPlanAuditQuality/Resources/AccountingandAuditingResourceCenters/Pages/Risk%20Assessment%20Standards%20Nos.aspx ). Accessed Jun. 27, 2011.

(Continued)

*Primary Examiner* — Anh Tai Tran
(74) *Attorney, Agent, or Firm* — Katten Muchin Rosenman LLP

(57) ABSTRACT

Systems and methods are disclosed for distributing content pursuant to audit-based processes. Audit content in runtime workpapers may be dynamically constructed in response to industry-driven and response-driven rules using information from one or more of the distributed content libraries. Dynamic updates may also be provided for generated runtime workpapers constructed from the distributed content. The system and method may also provide drilldown functionality for enabling a user to view a source workpaper for a specified data value which has flowed into the generated dynamic workpaper and/or tip functionality to provide a user with additional guidance based on the status and data associated with the generated workpaper.

20 Claims, 22 Drawing Sheets

(56) References Cited

OTHER PUBLICATIONS

Author: CCH Incorporated; Title: "ProSystem fx Engagement—User Guide"; Publisher: CHH Incorporated; Pertinent pp. 1-415, Nov. 2008.
International Preliminary Report on Patentability containing Search Report and Written Response—Mailed Dec. 16, 2011.

| | | |
|---|---|---|
| Content Libraries<br>Knowledge + Rules + Presentation<br>Domain-Specific<br>202 | Knowledge | lists, questions, paragraphs, workflow steps, keywords, hyperlinks, contextual guidance" business objects, etc. |
| | Rules | diagnostics, flows, auto-add/delete, show/hide, enable/disable, etc. |
| | Presentation | skeleton files, templates, placeholders, etc. |
| | Data Reference Object Model | customizable, domain-specific, leveraged by all content types |
| Content Integration<br>Extensible Infrastructure<br>"Ecosystem" Generic for Any<br>Content<br>204 | Edit | Remote collaborative editing (checkout/checkin)<br>Familiar tools (XML editor, word processor and/or spreadsheet templates such as, Microsoft Word and Excel ) or extensible to any front end |
| | Validate | Identify / resolve issues upstream (before runtime) |
| | Build | Raw content transformed<br>Extensible to any distributable format |
| | Test | Available immediately in runtime environment |
| Content Distribution<br>via Cloud<br>206 | Publish | Publishers send content "packages" to the cloud |
| | Purchase, Download | Customers purchase licenses download content to local environment |
| Content Administration<br>by Customer<br>208 | Review, Customize | Content administrators prepare for deployment to end users |
| | Approve, Synchronize | Approved content is synchronized seamlessly |
| Content Runtime<br>Content + User Data<br>Runtime Documents<br>210 | Construct | Dynamic binding to construct runtime instance<br>• Content: knowledge, rules, presentation (:see above)<br>• User Data: responses, linked data, etc. |
| | Refresh | Dynamic updates to refresh runtime instances<br>• Content: approved changes released by content administrator<br>• User Data: modifications trigger rules and data flows |
| | Workflow | Currently:<br>• Dynamically updated summary documents<br>• Rule-based diagnostics |

FIG. 2

| Contributors | Source | Examples |
|---|---|---|
| "Knowledge" Library Elements 502 | KBA Content Library 510 | • Program Steps<br>• Questions<br>• Paragraphs<br>• Keyword Replacements<br>• Etc. |
| "Presentation" Library Elements 504 | KBA Content Library 510 | • Workpaper Skeletons / Workpaper Definitions<br>• Table Templates / Table Definitions<br>• Placeholders (in workpapers)<br>• Etc. |
| "Rules" Library Elements 506 | KBA Content Library 510 | Rules associated with the above, including:<br>• Tailoring rules<br>• Program step relevancy rules<br>• Show/hide rules<br>• Etc. |
| User Data 508 | User-Supplied Binder Data 512 | • Answers to questions<br>• Program step selections<br>• Customizations<br>• Risks<br>• Comments / WP references<br>• Etc. |

FIG. 5

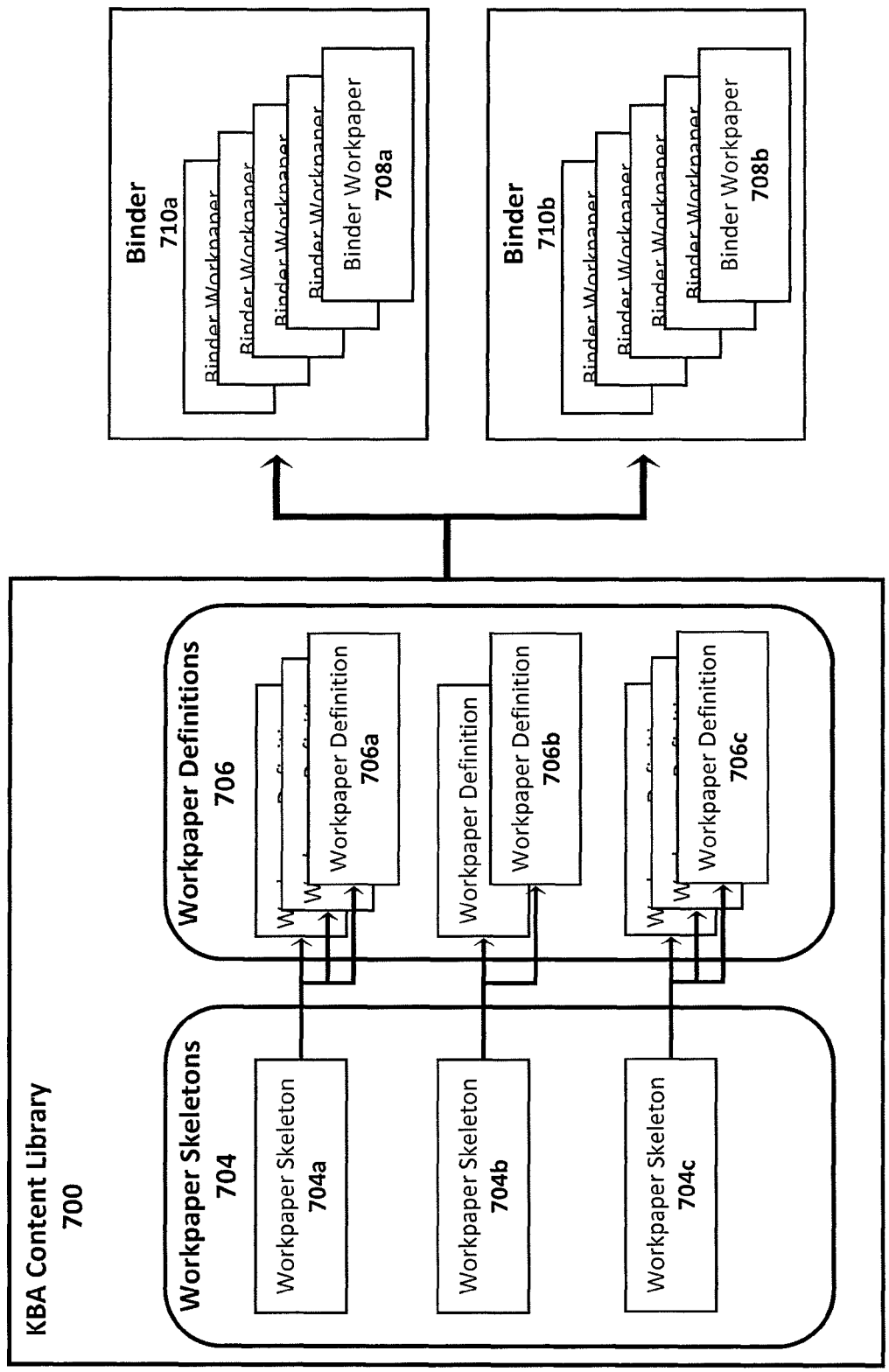

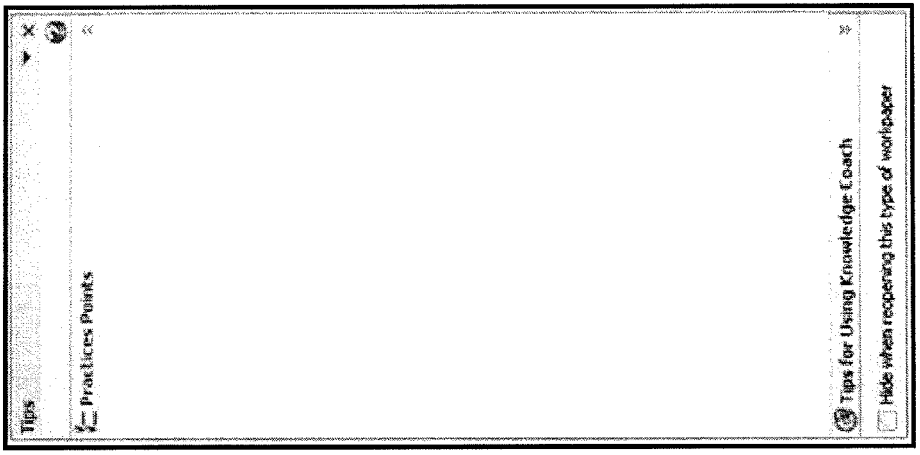
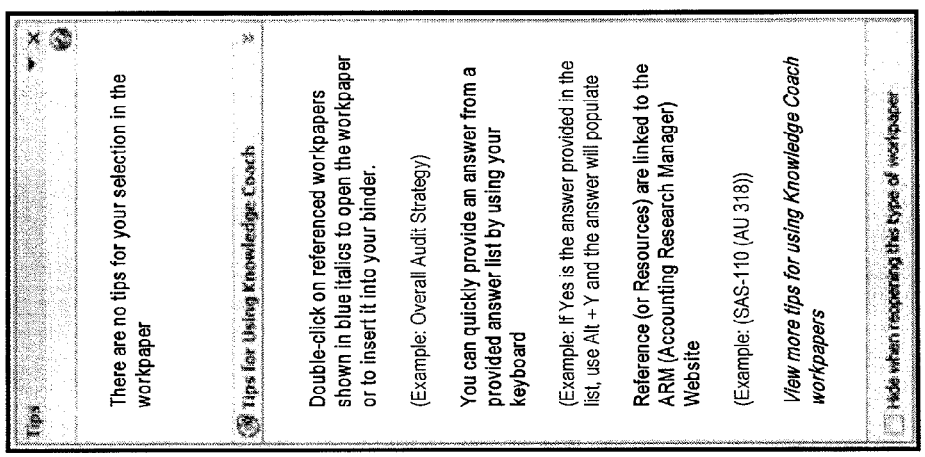
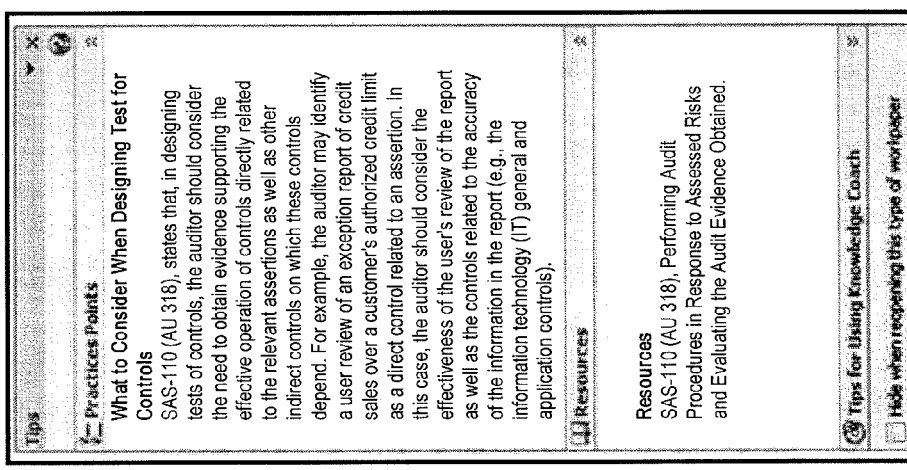
FIG. 15c

COMPUTER-IMPLEMENTED SYSTEM AND METHODS FOR DISTRIBUTING CONTENT PURSUANT TO AUDIT-BASED PROCESSES

CROSS-REFERENCE TO RELATED APPLICATIONS

This application is a continuation of U.S. patent application Ser. No. 13/191,494, filed Jan. 24, 2011, which claims priority to U.S. Provisional Patent Application No. 61/368,214, filed on Jul. 27, 2010, each entitled "Computer-Implemented System And Methods For Distributing Content Pursuant To Audit-Based Processes," each of which are hereby incorporated by reference.

TECHNICAL FIELD

The present invention relates to computer-based systems, methods and apparatuses for providing dynamic content distribution pursuant to one or more rules and/or conditions. More specifically, the present invention relates to computer-based systems, methods and apparatuses for providing dynamic content distribution pursuant to audit-based processes.

BACKGROUND INFORMATION

An important objective of an audit is to assert a reliable opinion regarding the material accuracy of an entity's financial statements; thus, the role of an auditor is to provide a reasonable level of substantiation for that opinion. But reviewing every accounting operation of a company would be unrealistically time consuming. Similarly, reviewing a company's accounting operation cursorily would not yield a sufficient level of substantiation. Therefore, a trend in the accounting industry is toward risk-based auditing—determining the appropriate target areas and levels of substantive testing to be performed. Risk-based auditing typically involves asking questions to determine where potential risks may be located to inform the auditor about those areas where substantive testing may be preferred (e.g., taking a random sampling of transactions to see whether the aggregate of a random sampling matches up with the claim totals on a pro rata basis). To facilitate risk-based auditing, numerous methods, systems and computer-implemented programs have been developed.

For example, ProSystem fx Knowledge Tools™ ("Knowledge Tools") was released by CCH, a Wolters Kluwer company, in April 2007 to help accounting firms comply with the American Institute of CPA's ("AICPA") most recent Risk Assessment Standards. The Risk Assessment Standards were released in the first half of 2008, when the AICPA's Audit and Attest Team staff issued Twelve new Technical Practice Aids ("TPAs") to assist auditors in implementing Statements of Auditing Standards 104-111 (more commonly known as the "Risk Assessment Standards"). These TPAs, which are non-authoritative, AICPA staff technical questions and answers, were developed in response to common questions received from AICPA members. For further information on the Risk Assessment Standards, see the AICPA's Web site.

Knowledge Tools was built upon the foundation provided by a software system for paperless workflow solutions, CCH's ProSystem Fx® Engagement™ ("ProSystem Engagement"), as well as Microsoft® Office™, to combine advances in technology and audit methodology. Knowledge Tools combines technology with Knowledge-Based Audit ("KBA") methodology to give a user an integrated set of procedures from pre-engagement through evaluation, conclusion and reportage. It provides a strong framework to help the user manage industry-specific auditing standards and ensures that important information is not overlooked or hidden in the details of numerous checklists and forms.

The KBA methodology within Knowledge Tools and the new ProSystem fx Knowledge Coach provides an easy-to-use, tailored audit process that (i) enhances communication between team members and allows for the ongoing evaluation of procedures; (ii) enables audit team members to view summaries of the risks and findings via the communications hub during each stage of an audit; (iii) ensures consistency and standardization across all published documents; and (iv) incorporates work-flow features of ProSystem Engagement, including, for example, binder sharing and synchronization, integrated audit programs, checklists, reports and more. For further information on Knowledge Tools, available from CCH.

Despite the numerous benefits of Knowledge Tools, it would be highly advantageous to shift from a static audit content (e.g., content not associated with rules such as the content type currently employed in Knowledge Tools workpapers) to a dynamic system that allows a user to dynamically update documents based on, for example, modified data, rules, conditions, etc. Therefore, there is a need for a versatile system, method and/or apparatus that would enable the use of content to efficiently generate dynamic workpapers, reports and other documents. Such a system may be integrated with existing auditing tools—including, for example, Knowledge Tools—or used independently. Similarly, a system should be developed so that it could be applied to any system where dynamic content may be advantageous.

SUMMARY

Various embodiments are disclosed herein for computer-based systems, methods and apparatuses for providing content distribution pursuant to one or more sets of rules, including, for example, auditing processes.

According to a first aspect of the present invention, a computer-implemented method for distributing content pursuant to an audit-based process, comprises: receiving annotated documents containing industry-specific content authored by experts in the field of audit-based processes; decomposing the annotated documents into individual content elements for inclusion in a content library database; distributing related collections of said content elements via content packages; merging said content elements into an end user's content library database; and using a computer to generate a dynamic workpaper from the individual content elements in the content library database, in accordance with at least one predetermined rule, wherein the generated workpaper is also dynamically updated in response to (i) changes to user-supplied data or (ii) receipt of subsequent versions of the associated content elements.

According to a second aspect of the present invention, a computer system for distributing content pursuant to an audit-based process, comprises: a memory; a communication device operatively coupled to the memory to receive annotated documents containing industry-specific content authored by experts in the field of audit-based processes; and at least one processor, operatively coupled to the communications device for decomposing the annotated documents into individual content elements for inclusion in a content library database, distributing related collections of said content elements via content packages, and merging said content elements into an end user's content library database, wherein the at least one processor generate a dynamic workpaper from the individual content elements in the content library database, in accordance with at least one predetermined rule, wherein the generated workpaper is also dynamically updated in response to (i) changes to user-supplied data or (ii) receipt of subsequent versions of the associated content elements.

According to a third aspect of the present invention, a computer network for distributing content pursuant to an audit-based process comprises: a memory; a communication device operatively coupled to the memory to receive annotated documents containing industry-specific content authored by experts in the field of audit-based processes; and at least one processor, operatively coupled to the communications device for decomposing the annotated documents into individual content elements for inclusion in a content library database, distributing related collections of said content elements via content packages, and merging said content elements into an end user's content library database, wherein the at least one processor generates a dynamic workpaper from the individual content elements in the content library database, in accordance with at least one predetermined rule, wherein the generated workpaper is also dynamically updated in response to (i) changes to user-supplied data or (ii) receipt of subsequent versions of the associated content elements.

According to a fourth aspect of the present invention, a computer system for distributing content pursuant to an audit-based process comprises: a content library database on one or more computer-readable media; a communication device operatively coupled to the content library database to receive annotated documents containing industry-specific content; and at least one processor, operatively coupled to the communication device for (i) receiving, using one or more computers, annotated documents containing industry-specific content; (ii) decomposing, using said one or more computers, the annotated documents into a plurality of individual content elements, wherein said plurality of individual content elements are stored to the content library database, wherein said plurality of individual content elements include knowledge and presentation elements, wherein the presentation elements define a workpaper skeleton; (iii) identifying, using said one or more computers, individual content elements that are related to one another based upon one or more pre-determined criteria; (iv) merging said individual content elements that are related to one another into content packages; and (v) using one or more computers to dynamically generate a dynamic workpaper, wherein the dynamic workpaper is generated using data associated with a content package in accordance with at least one predetermined rule, wherein the dynamic workpaper is dynamically updated in response to (i) changes to presentation elements, or (ii) changes to knowledge elements.

According to a fifth aspect of the present invention, a computer-implemented method for distributing content pursuant to an audit-based process comprises: receiving, using one or more computers, annotated documents containing industry-specific content; decomposing, using said one or more computers, the annotated documents into a plurality of individual content elements, wherein said plurality of individual content elements are stored to a content library database on one or more computer-readable media, wherein said plurality of individual content elements include knowledge and presentation elements, wherein the presentation elements define a workpaper skeleton; identifying, using said one or more computers, individual content elements that are related to one another based upon one or more pre-determined criteria; merging said individual content elements that are related to one another into content packages; and using one or more computers to dynamically generate a dynamic workpaper, wherein the dynamic workpaper is generated using data associated with a content package in accordance with at least one predetermined rule, wherein the dynamic workpaper is dynamically updated in response to (i) changes to presentation elements, or (ii) changes to knowledge elements.

According to a sixth aspect of the present invention, a computer system for distributing content pursuant to an audit-based process comprises: a content library database on one or more computer-readable media; a communication device operatively coupled to the content library database to receive annotated documents containing industry-specific content; and at least one processor, operatively coupled to the communication device for (vi) receiving, using one or more computers, annotated documents containing industry-specific content; (vii) decomposing, using said one or more computers, the annotated documents into a plurality of individual content elements, wherein said plurality of individual content elements are stored to the content library database, wherein said plurality of individual content elements include knowledge and presentation elements, wherein the presentation elements define a workpaper skeleton, wherein the knowledge elements define data values suitable for inclusion within a dynamically generated audit workpaper; (viii) identifying, using said one or more computers, individual content elements that are related to one another based upon one or more pre-determined criteria; (ix) posing a question to a user wherein the user provides user-supplied reply data; (x) merging said individual content elements that are related to one another into content packages; and (xi) using one or more computers to dynamically generate a dynamic workpaper, wherein the dynamic workpaper is generated using data associated with a content package in accordance with at least one predetermined rule, wherein the predetermined rule defines custom logic for determining dynamic association of knowledge elements, presentation elements, and user-supplied reply data, wherein the dynamic workpaper is dynamically updated in response to (i) changes to presentation elements, or (ii) changes to knowledge elements.

In certain aspects, the generated dynamic workpaper may comprise: (i) text; (ii) a chart; (iii) a table; (iv) a graphic image; or (v) combinations thereof. The generated dynamic workpaper may be dynamically updated to reflect new or amended predetermined rules.

In other aspects, the system and/or method may pose questions to a user wherein the user provides answers that are used generate the generated dynamic workpaper.

In another aspect, edits made to a generated workpaper may be used to dynamically update other sections of the generated workpaper.

In yet another aspect, the generated dynamic workpaper may provide (i) drilldown functionality for enabling a user to view a source workpaper for a specified data value that has flowed into the generated dynamic workpaper and/or (ii) tip functionality to provide a user with additional guidance based on the status and data associated with the generated workpaper. The tip functionality may be triggered by, for example, selecting an icon embedded within the generated workpaper to provide information related to one or more topics chosen from a group consisting of: (i) practice points;

(ii) related workpapers; (iii) resources; (iv) examples; (v) user assistance; and (vi) combinations thereof.

In yet another aspect, the generated workpaper may include functionality enabling a user to access a web-based research system by selecting a hyperlink embedded within the generated workpaper or the related tips.

BRIEF DESCRIPTION OF THE DRAWINGS

Embodiments of the present invention are illustrated by way of example, and not by limitation, in the figures of the accompanying drawings, in which like references indicate similar elements and in which:

FIG. 2 is a table illustrating various elements of the Knowledge Coach system;

FIG. 5 is a table illustrating exemplary elements for a KBA content library;

FIG. 7 illustrates an exemplary relationship between workpaper skeletons and workpaper definitions within a content library and binder workpapers within a binder;

FIGS. 15a through 15d are block diagrams illustrating Knowledge Coach's ability to interface with tips and web-based research systems.

DETAILED DESCRIPTION

Figure 1:
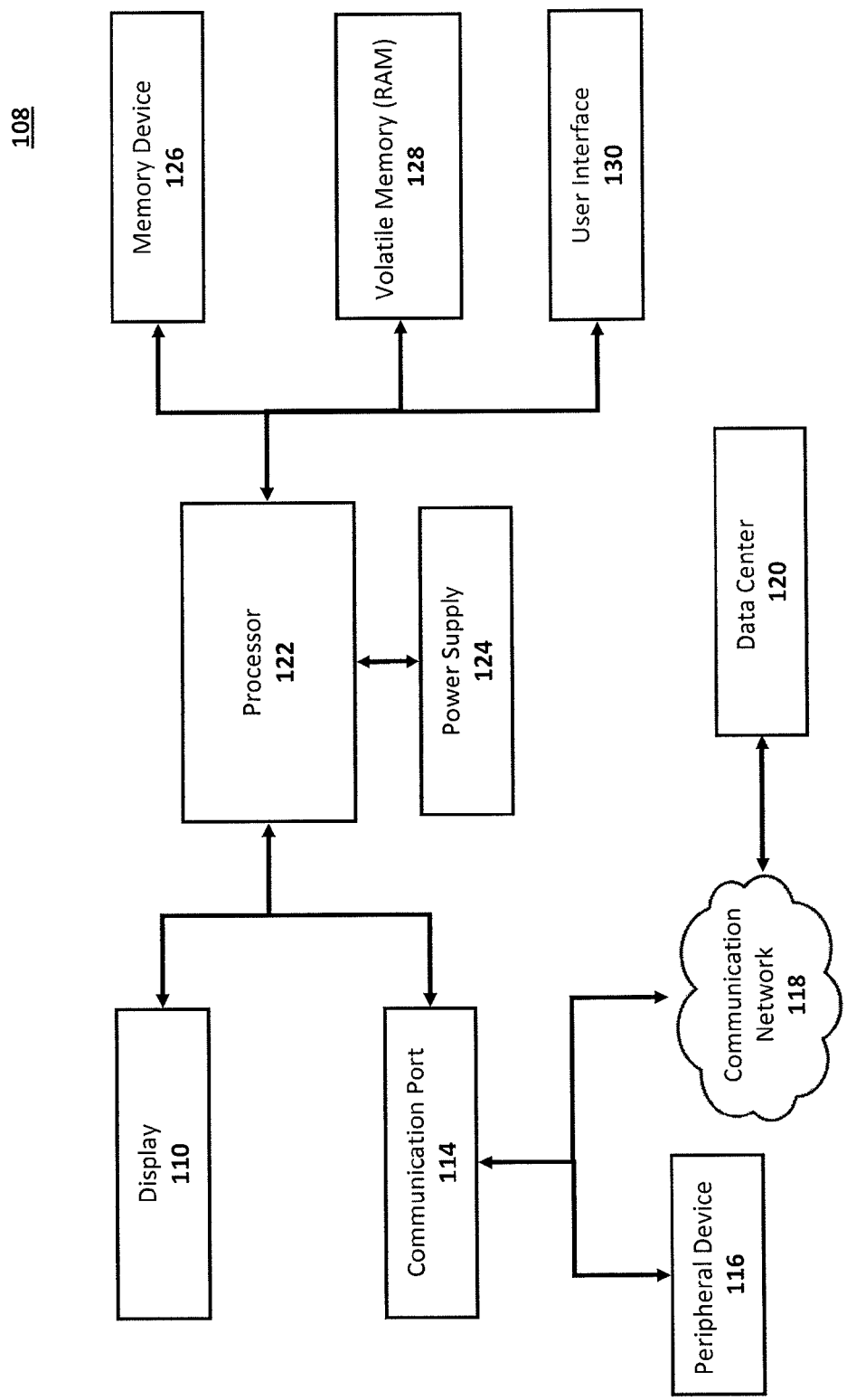
FIG. 1 is a diagram illustrating an exemplary, processor-based system enabled to carry out risk-based auditing processes.

The present invention is described herein with reference to one or more exemplary embodiments; however, it should be understood that the present invention is not limited to these embodiments. Those skilled in the art will appreciate that other arrangements, formulations and elements can be used instead and that some elements may be omitted altogether. In the following description, well-known functions or constructions may not be described extensively because they would obscure the invention in unnecessary detail.

Under an exemplary embodiment, a computer-implemented process is designed to dynamically distribute content pursuant to audit-based processes, herein referred to as ProSystem fx Knowledge Coach™ system (or "Knowledge Coach"). Knowledge Coach, an addition to the CCH ProSystem fx Suite, provides features and requirements not in the scope of the Knowledge Tools system, including, for example, dynamic content distribution.

Knowledge Coach streamlines audit planning and management, thus ensuring compliance with the AICPA Risk Assessment Standards, while allowing auditors to dynamically make updates throughout the audit. Using Knowledge Coach, auditors can update data (e.g., answers to questions) on the fly during the engagement, and all of these changes will be dynamically distributed within and throughout the dynamic workpapers to all of the necessary places (e.g., any place impacted by an update). One notable feature is that the Knowledge Coach system may be fully operated from within a paperless document management system—including, for example, ProSystem Engagement—which can handle the organization, rights management and version control for all workpaper documents. Knowledge Coach may also be enabled to automatically (e.g., via predetermined rules) flag program steps that may not be applicable and/or are redundant, thereby allowing the auditor to omit them if desired.

Automatic entries may include features such as drill-down functionality, thus allowing the user to trace the data back to its source to provide transparency. The drill-down functionality may also provide the user with the option to view the workpaper in which the data was entered.

The Knowledge Coach system may also integrate built-in links that provide up-to-date research content. In some instances, the built-in links may redirect the user to a third-party system wherein log-on credentials may be necessary. The various features of the Knowledge Coach system will now be described in greater detail. For this application the following terms and definitions shall apply:

The terms "communicate" and "communicating" as used herein include both conveying data from a source to a destination and delivering data to a communications medium, system, channel, network, device, wire, cable, fiber, circuit and/or link to be conveyed to a destination. The term "communication" as used herein means data so conveyed or delivered. The term "communications" as used herein includes one or more of a communications medium, system, channel, network, device, wire, cable, fiber, circuit and link.

The terms "coupled," "coupled to" and "coupled with" as used herein each mean a relationship between or among two or more devices, apparatuses, files, circuits, elements, functions, operations, processes, programs, media, components, networks, systems, subsystems and/or means, constituting any one or more of (a) a connection, whether direct or through one or more other devices, apparatuses, files, circuits, elements, functions, operations, processes, programs, media, components, networks, systems, subsystems or means, (b) a communications relationship, whether direct or through one or more other devices, apparatuses, files, circuits, elements, functions, operations, processes, programs, media, components, networks, systems, subsystems or means, and/or (c) a functional relationship in which the operation of any one or more devices, apparatuses, files, circuits, elements, functions, operations, processes, programs, media, components, networks, systems, subsystems or means depends, in whole or in part, on the operation of any one or more others thereof.

The term "data" as used herein means any indicia, signals, marks, symbols, domains, symbol sets, representations and any other physical form or forms representing information, whether permanent or temporary, whether visible, audible, acoustic, electric, magnetic, electromagnetic or otherwise manifested. The term "data," as used to represent predetermined information in one physical form, encompasses any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report or a list or in any other form.

The term "network" as used herein includes both networks and inter-networks of all kinds, including the Internet, and is not limited to any particular network or inter-network.

The term "processor" as used herein means processing devices, apparatuses, programs, circuits, components, systems and subsystems, whether implemented in hardware, tangibly embodied software or both, and whether or not programmable. The term "processor" as used herein includes, but is not limited to, one or more computing devices, hardwired circuits, signal modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities and combinations of any of the foregoing.

The term "computer" as used herein means a device, or collection of devices, having a processor and enabled to perform one or more prescribed mathematical and/or logical operations.

The terms "workpaper" and "workpapers" as used herein mean documents prepared or obtained by an auditor in performing an examination of a client's financial records. Included in the workpapers are, for example, questionnaires, forms, schedules, analyses, transcriptions, memos and confirmation results related to balance sheet and income statement items. The workpapers serve as the basis of the work performed and support the auditor's opinion.

The term "binder" as used herein means a collection of related workpapers.

The term "KBA content integrator" as used herein refers to the people who execute the step in the workflow through which source documents with annotations are decomposed into content elements within the "KBA content integration environment."

The term "KBA content integration environment" as used herein refers to the decomposed content elements and associated software to edit those content elements before they are published into "KBA content package." Multiple "KBA content titles" are maintained within the KBA, content-integration environment.

The term "KBA content title" as used herein refers to a related collection of content elements that are published together within a "KBA content package," administered together within a "KBA content library," and used together within the run-time software system.

The term "KBA content package" as used herein refers to the published, portable container of the content elements in a single "KBA content title," downloaded by content administrations into a "KBA content library."

The term "KBA content library" as used herein refers to a related collection "KBA content titles" in a database that is used by the run-time software system.

The term "knowledge content elements" as used herein refers to text-based intellectual property, for example, unformatted text, formatted text, keywords, lists, questions, and a variety of text-based elements specific to audit processes.

The term "presentation content elements" as used herein refers to visual containers and the building blocks within those visual containers, as used for example to present knowledge content elements and user responses to the users.

The term "rules" as used herein refers to the logic that is applied to knowledge content elements, presentation content elements, and user-supplied data.

The term "data reference object model (DROM)" as used herein refers to objects and properties through which logical design elements (content elements and user data) are referenced by other logical design elements.

The term "data reference expressions" as used herein refers to DROM expressions which are associated with other logical design elements—such as conditional expressions in rules—and which are evaluated at run time into values or sets of values.

The term "data reference bindings" as used herein refers to DROM expressions which bind elements in the DROM to other logical design elements—particularly presentation elements such as tables, table rows, and table cells—and which are resolved at run time into objects, object collections, value, or value collections.

The term "data reference editors" as used herein refers to the user interface through which users identify data reference expressions and data reference bindings.

The term "data reference engine" as used herein refers to the run-time engines for data reference expressions and data reference bindings.

Knowledge Coach provides numerous advantages over previous tools—such as Knowledge Tools, including, for example—a central paradigm shift from the "static" audit content of Knowledge Tools workpapers to the "dynamic" audit content of Knowledge Coach workpapers. Specifically, in Knowledge Tools, the audit content is distributed as richly populated and largely non-customizable word processor or spreadsheet templates (e.g., Microsoft® Word and Excel® templates), whereas in Knowledge Coach, the audit workpapers may be constructed and dynamically tailored in response to industry-driven and response-driven rules using information from a centrally managed content library. An exemplary system may be generally described as comprising (i) Knowledge Tools (e.g., tagged KBA templates and/or "static" KBA workpapers); and (ii) Knowledge Coach (e.g., CCH-authored KBA content library and/or "dynamic" KBA workpapers). FIG. 1 depicts an exemplary processor-based system 108 that may include one or more memory devices 126 capable of carrying out the present invention. The system 108 may be any of a variety of devices such as a computer system, computer, pager, cellular phone, personal organizer, control circuit, etc. In a typical processor-based system, one or more processors 122, such as a microprocessor, control the processing of system functions and requests in the system 108. In certain embodiments, various existing processor-based devices may be modified merely by software and/or minor hardware changes to carry out the present disclosure. The system 108 typically includes a power supply 124. For instance, if the system 108 is a portable system, the power supply 124 may advantageously include a fuel cell, permanent batteries, replaceable batteries, and/or rechargeable batteries. The power supply 124 may also include an AC adapter, so the system 108 may be plugged into a wall outlet, for instance. The power supply 124 may also include a DC adapter such that the system 108 may be plugged into a vehicle cigarette lighter, as another example.

Various other devices may be coupled to the processor 122 depending on the functions that the system 108 performs. To illustrate, a user interface 130 may be coupled to the processor 122. The user interface 130 may include buttons, switches, a keyboard, a light pen, a mouse, a digitizer and stylus, and/or a voice recognition system, for instance. A display 110 may also be coupled to the processor 122. The display 110 may include an LCD, an SED display, a CRT display, a DLP display, a plasma display, an OLED display, and/or LED display, for example. One or more communication ports 114 may also be coupled to the processor 122. The communication port 114 may be adapted to be coupled, wired or wirelessly, to one or more peripheral devices 116. The one or more peripheral devices 116 may include, for example, a modem, printer, computer or other auxiliary device. In certain embodiments, the communication port 114 may be enabled for communication, wired or wirelessly, with a communication network 118, such as a local area network, remote area network, intranet or the Internet, for instance.

The communication network 118 may be coupled to a data center 120 capable of providing and/or integrating data from multiple sources and for standardizing the data to make processing and management of the information more efficient. The processor 122 generally controls the system 108 by implementing software programs stored in the memory. The memory is operably coupled to the processor 122 to store and facilitate execution of various programs. For instance, the processor 122 may be coupled to the volatile memory 128 which may include Dynamic Random Access Memory ("DRAM") and/or Static Random Access Memory ("SRAM"). The volatile memory 128 is typically large so that it can store dynamically loaded applications and data. As described further below, the volatile memory 128 may be configured in accordance with embodiments of the present invention.

The processor 122 may also be coupled to a memory device 126. The memory device 126 may include a Read-Only Memory ("ROM"), such as Erasable Programmable Read-Only Memory ("EPROM"), and/or flash memory to be used in conjunction with the volatile memory 128. Similarly, depending on the system configuration, memory device 126 may spread data across one or more servers. The size of the ROM is typically selected to be just large enough to store any necessary operating system, application programs and fixed data. Additionally, the non-volatile memory may include a high-capacity memory such as a tape or disk drive memory. In an embodiment of the invention, the memory device 126 may include a separate data center used to store data that is generally used on a less frequent basis. The memory device 126 and volatile memory 128 may store various types of software, such as an operating system, Knowledge Coach, an office productivity suite including a word processing application, a spreadsheet application, an email application and/or a database application.

As exemplified in FIG. 2, Knowledge Coach generally employs content libraries 202, a content integration environment 204, a distribution system and/or apparatus 206, system administration functionality 208 and run-time functionality 210.

The content libraries 202 generally comprise four types of content elements: (i) knowledge elements (e.g., lists, questions, paragraphs, workflow steps, keywords, hyperlinks, contextual guidance business objects, etc.); (ii) presentation elements (e.g., skeleton files, templates, placeholders, etc.); (iii) rules elements (e.g., diagnostics, flows, auto-add/delete, show/hide, enable/disable, etc.); and (iv) data reference object models, which may be customizable, domain-specific, leveraged by all content types.

The content integration environment 204, which may be a generic system capable of being configured to process and handle any type of content, generally comprises at least four functions: (i) to edit (e.g., remote collaborative editing (check-out/check-in), familiar tools (XML editor, word processor and/or spreadsheet templates such as Microsoft® Word and Excel®), or extension to any front-end software or device); (ii) to validate (e.g., enabled to identify and resolve issues upstream (i.e., before runtime)); (iii) to build (e.g., raw content transformed and extensible to any distributable format); and (iv) to test (e.g., available immediately in runtime environment).

The content distribution 206 component, which may be accomplished via a cloud (e.g., network hosting), generally comprises at least two general functions: (i) to publish (e.g., publishers send content "packages" to the cloud); and (ii) to provide purchase/download capability (e.g., customers may purchase licenses and/or download content to local environment).

The content administration 208 portion, on the user side, generally comprises at least two functions: (i) to review/customize (e.g., content administrators prepare for deployment to end users); and (ii) to approve/synchronize (e.g., approved content may be synchronized seamlessly).

Finally, the content run-time 210 portion generally comprises at least three functions: (i) to construct (e.g., dynamic binding to construct run-time instance based on content: (a) knowledge, (b) rules, (c) presentation and User Data such as responses, linked data, etc.); (ii) to refresh (e.g., dynamically update to refresh run-time instances based on content (approved changes released by content administrator) and user data (modifications trigger rules and data flows)); and (iii) to support workflow (e.g., dynamically update summary documents and rule-based diagnostics).

Figure 3:
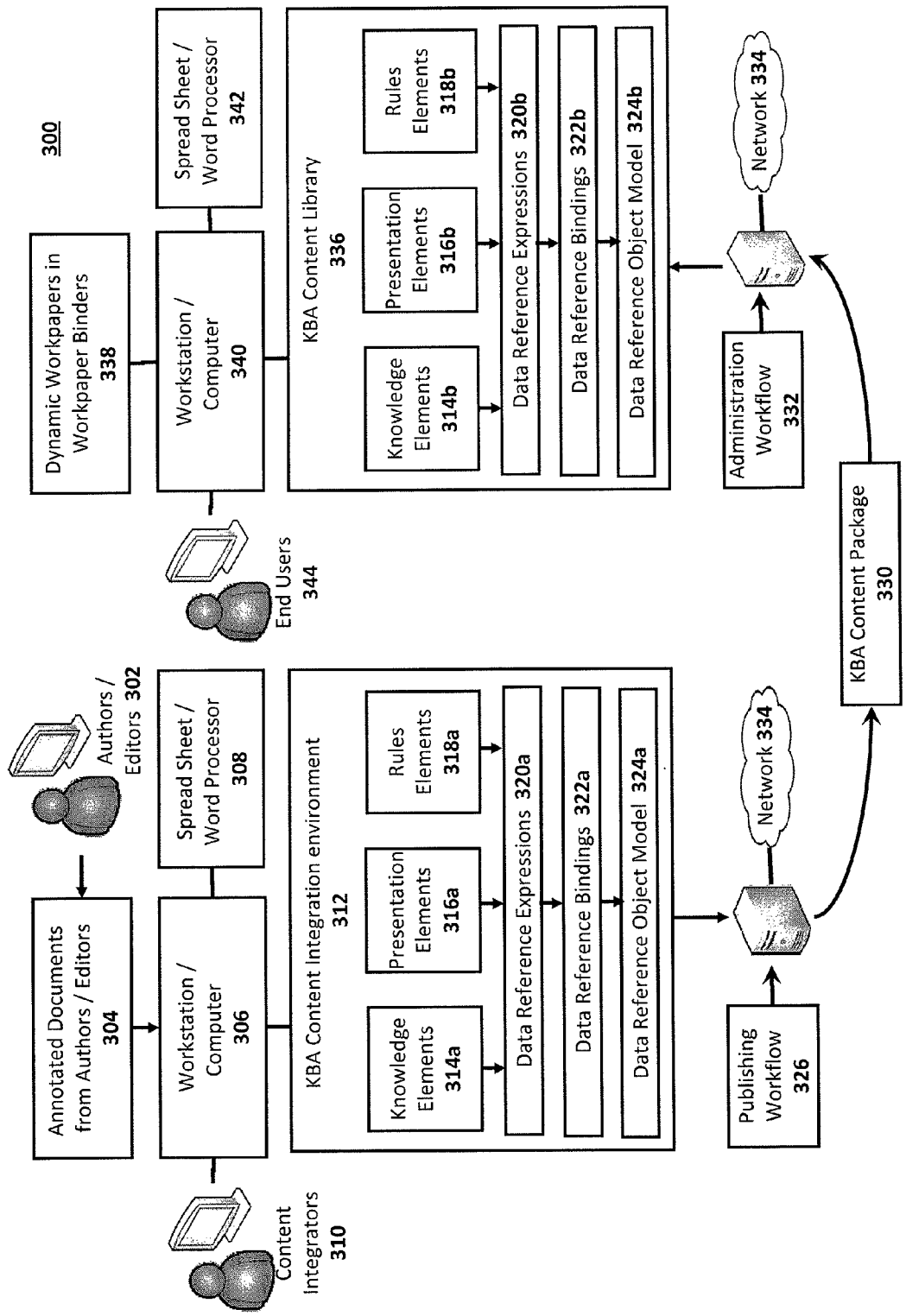
FIG. 3 is a diagram of an exemplary life cycle for a KBA document according to an embodiment of the present invention.

FIG. 3 depicts an exemplary lifecycle for a KBA document, from the time annotated documents 304 are received from an author 302 to the point dynamic workpapers 338 are generated by end users 344. In operation, the system 300 may receive annotated documents 304 containing industry-specific content, such as tailoring questions and audit procedures, from authors and/or editors 302. Content integrators 310 may then extract information from these annotated documents 304 and decompose that information into content elements comprising knowledge elements 314a, presentation elements 316a and rules elements 318a, through the use of, for instance, a computer 306 having word processors, spreadsheet programs and/or other types of editing tools 308. Within the KBA content integration environment 312, these elements reference each other through data reference expressions 320a, which are bound through data reference bindings 322a to the data reference object model 324a. Together, all those components comprise a KBA content title which may be bundled into a KBA content package 330, which may be published through the publishing workflow 326 via network 324. Packages are subsequently downloaded and reconstituted into a KBA content library 336, which may be synchronized through a network 334 via administration workflow 332 to the workstation of the end user 344, who uses the KBA content library 336 in conjunction with, for instance, work processors, spreadsheet programs and other subsystems to construct dynamic workpapers 338. KBA content library 336 complies a workpaper from the content elements comprising knowledge elements 314b, presentation elements 316b and rules elements 318b, through the use of, for instance, a computer 340 having word processors, spreadsheet programs and/or other types of editing tools 342. These elements reference each other through data reference expressions 320b, which are bound through data reference bindings 322b to the data reference object model 324b.

Figure 4:
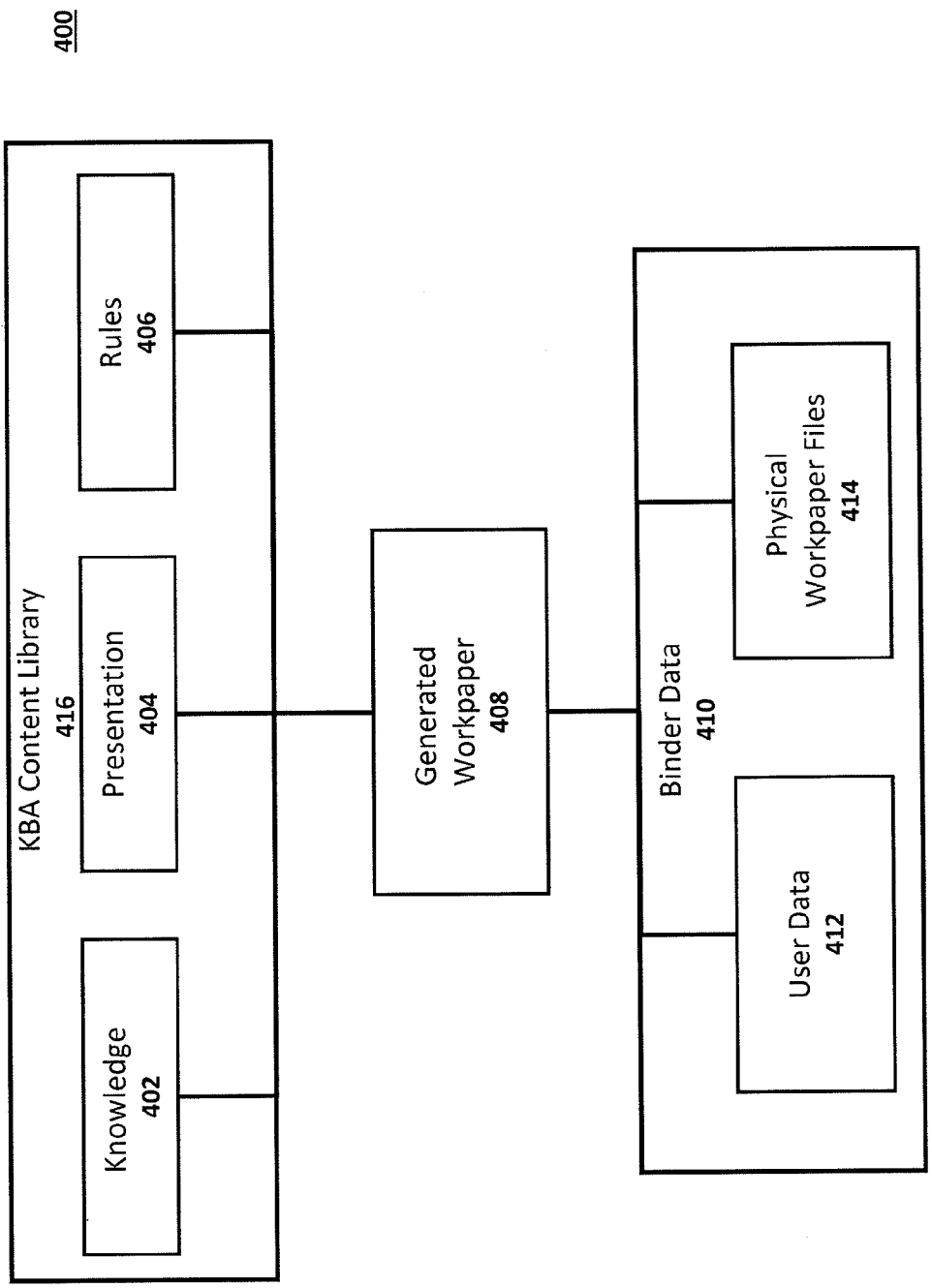
FIG. 4 is a diagram illustrating a relationship between various elements of the Knowledge Coach system.

FIG. 4 depicts the rule-driven construction of a Knowledge Coach workpaper 408. In essence, the generated workpaper 408 is dynamically constructed and refreshed using data and rules from multiple contributors, such as content elements from a KBA content library 416, which may include knowledge elements 402, presentation elements 404 and rules elements 406, along with binder data 410, such as physical workpapers 414 and/or user data 412. The resulting Knowledge Coach workpapers 408 are dynamically generated and subsequently updated when inputs change. FIG. 5 provides exemplary data content while describing the KBA content library 416 and binder data 410 in greater detail.

As illustrated in FIG. 5, with regard to knowledge data 502, KBA content libraries 510 may contain a collection of content elements, organized by titles and title versions that are downloaded from a server. These content objects generally represent the knowledge that may be delivered via Knowledge Coach. For instance, knowledge 502 may include, for example, program steps, unformatted text, formatted text, keywords, domain-specific content (e.g., audit areas, risks, program steps, program sub-steps, etc.), questions (including, for example, tailoring questions to determine relevance via rules and domain questions to capture domain-specific data), lists, external URLs and contextual tips. As described herein, unformatted text may be used to describe text that dynamically replaces text placeholders and keywords at run time and inherits style of run-time content while formatted text is text that may dynamically replace text placeholders at run time where style overrides context. For example, external URLs may provide contextual links to authoritative content such as, Accounting Research Manager® and IntelliConnect®, whereas contextual tips may be provide contextual links to industry-specific guidance via HTML panes.

With regard to presentation 504, a table template may be created in Knowledge Coach where the physical layout and display properties of the table are configured by a content builder prior to publication. Presentation 504 elements may generally comprise, for example, a skeleton document that contains layout and/or literal text with placeholders for presentation elements; placeholders (e.g., a reserved location within a workpaper skeleton, resolved to display content and/or data at run time); a document definition, which may be defined at design time and can provide binding instructions to replace placeholders at run time; table template(s); and styles.

As mentioned, Knowledge Coach is rule-driven, thus, the rules 506 dictate the treatment of various KBA content objects and when and where they are used during the run-time application. For example, program steps may be recommended (or not recommended) based on data-driven rules. There may be a number of other rules, including, for example, show/hide rules that control visibility of content based on user-supplied answers; diagnostic rules to control presence of diagnostic warnings based on user-supplied answers; data flow rules to control flow of user-supplied answers and calculated data within user data storage; drill-down rules to control drill-down behavior between fields; and "roll forward" rules to control preservation/resetting of user data. From the perspective of the user, the information that feeds these rules may come from a variety of sources, including, for example, (i) industry; (ii) audit area; (iii) risk assessments; (iv) planned audit approach; (v) assertions which the program step addresses; (vi) answers to tailoring questions, either in the same generated workpaper or in other generated workpapers; and (vii) recommendation status of "parent" steps (applicable only to sub-steps).

Finally, user data 508 may be extracted from the binder datastore 512 and used to populate the fields of the generated workpaper. For example, user data 508 may include (i) user-supplied answers to questions; (ii) user-selected program steps; (iii) user-supplied text customizations; (iv) user-selected risks; and/or (v) user-supplied comments.

A notable advantage of the Knowledge Coach system structure is the separation of "user data" from "presentation" within workpapers. This permits dynamic rules to be run against the "user data," yet that data is still made visible through the presentation format and/or structure, which may be generated from content elements in the content library. The table templates may reflect the specified layout and appearance of the tables and/or workpapers that will be required by end users—generally the same layout and appearance found in the original annotated documents supplied by the original authors and editors.

When utilizing a system where data is separate from presentation, either the table template or the table definition may identify the necessary data (drawn from the content library or the binder datastore) through, for example, data reference binding. At run time, the data may be retrieved and placed into tables/rows/cells in a Knowledge Coach table. When the data changes, due to editing, rules, etc., the table may be dynamically refreshed to reflect those changes. The refreshing may occur, for example, in real time, upon opening the document and/or upon selecting a refresh button. Elements used to achieve the separation of data and presentation and to achieve dynamic rendering are templates, skeletons, definitions and instances. Skeletons, which are typically reusable and extensible, may be, for example, Word and Excel® documents with placeholders for dynamic content.

Figure 6A:
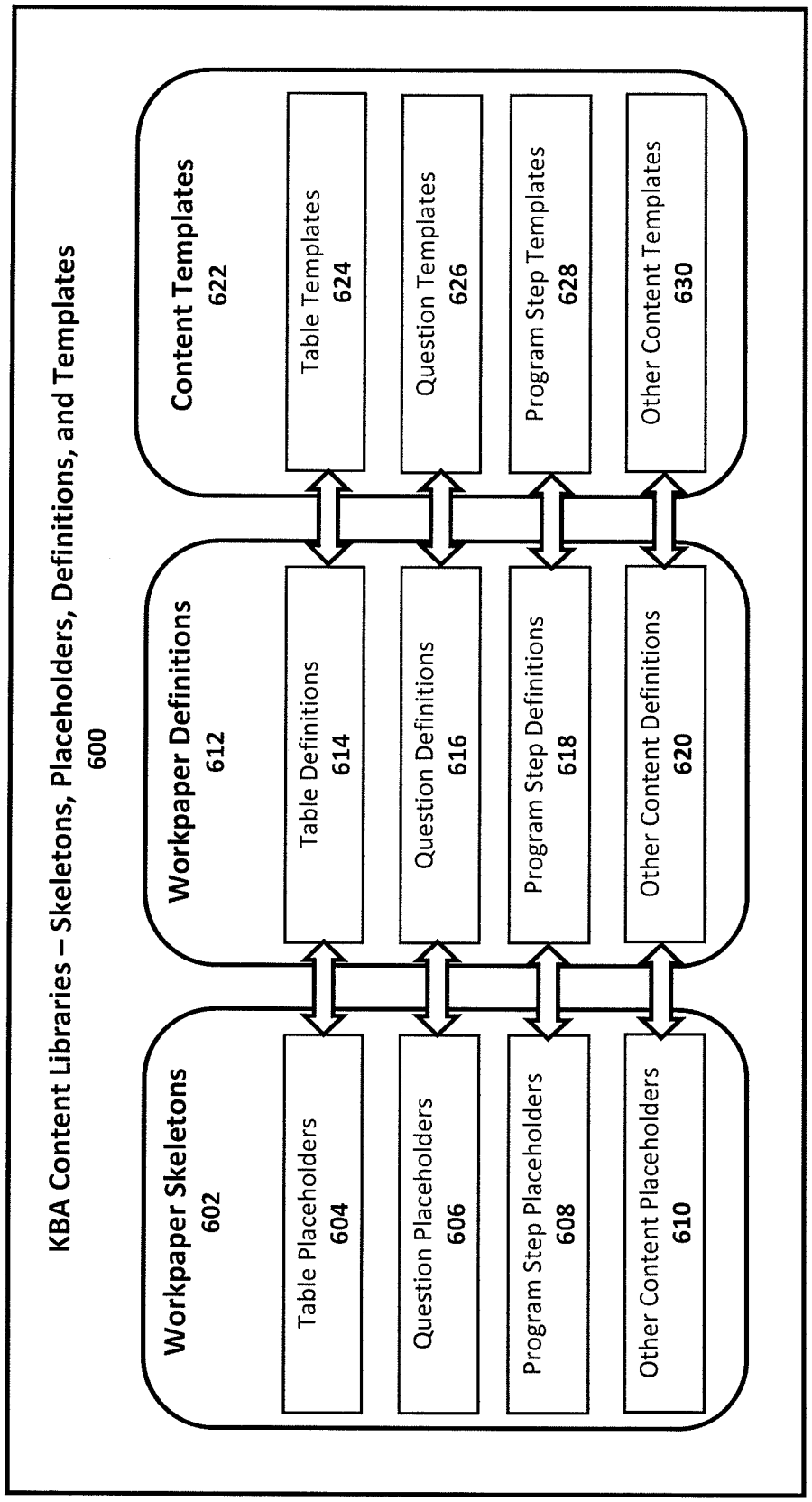
FIG. 6a is an exemplary block diagram illustrating exemplary presentation content elements within a KBA content library.
Figure 6B:
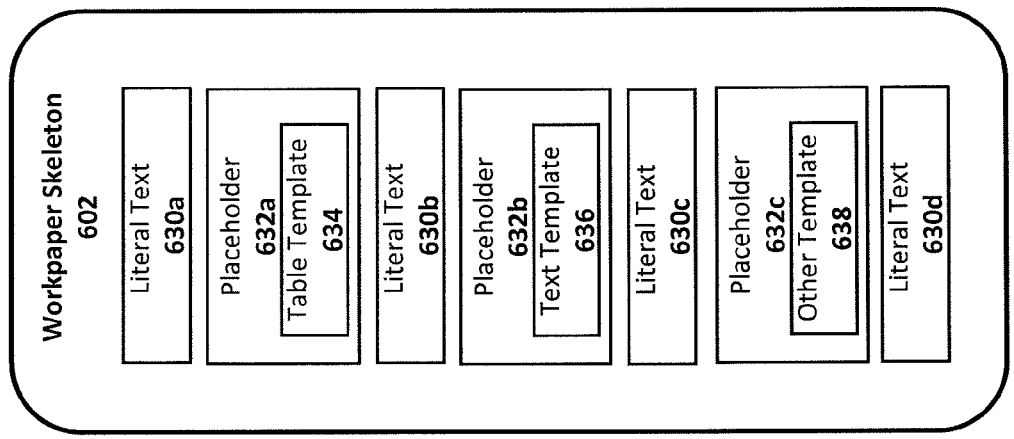
FIG. 6b illustrates a diagram of an exemplary workpaper skeleton enabled to receive formatted text, tables and/or other content and data via templates.

An exemplary configuration system where data is separate from presentation is detailed in FIGS. 6a and 6b. The content library 600 typically includes workpaper skeletons 602, workpaper definitions 612 and content templates 622. The framework provided by the workpaper skeleton 602 may be used to create a workpaper definition 612. The workpaper definition 612 may be combined with content templates 622, resulting in a workpaper instance when the user finally uses it in an audit binder. The workpaper skeleton 602 may contain, for example, placeholders for tables 604, questions 606, program steps 608 and other content 610. Similarly, workpaper definitions 612 may contain information defining how to resolve the placeholders via table definitions 614, question definitions 616, program step definitions 618 and other content definitions 620. Those definitions leverage content templates 622, for example, table templates 624, question templates 626, program step templates 628 and other content templates 630.

FIG. 6b illustrates an exemplary workpaper skeleton 602 enabled to receive formatted text, tables and/or other data templates. The workpaper skeleton 602 may include one or more sections of literal text 630a, 630b, 630c, 630d along with one or more placeholders 632a, 632b, 632c. The literal text may include any text outside of the placeholders including, for example, form verbiage. For verbiage may be used to described boilerplate text that would be the same for multiple workpapers. Placeholders 632a, 632b, 632c could be used to reserve a space before, after, or within the literal text 630a, 630b, 630c, 630d. For instance, if a user wishes to set up a workpaper skeleton 602 with a table inserted between literal text 630a and literal text 630b, a placeholder 632a may be inserted and configured to include and/or specify a table template 634 chosen from one or more templates (e.g., specific risks, tailoring questions, 6-column program steps, etc.). Similarly, placeholder 632b may be configured to receive formatted text using a formatted text template 636 or another template 638.

FIG. 7 illustrates the process by which workpaper skeletons 704 are used as the basis for workpaper definitions 706 within the KBA content library 700. In fact, the KBA content library 700 may contain multiple workpaper skeletons 704a, 704b, 704c, each of which may be used as the basis for one or more workpaper definitions 706a, 706b, 706c. Each workpaper definition may then be used to generate one or more binder workpaper instances 708a, 708b grouped into binders 710a, 710b.

Figure 8:
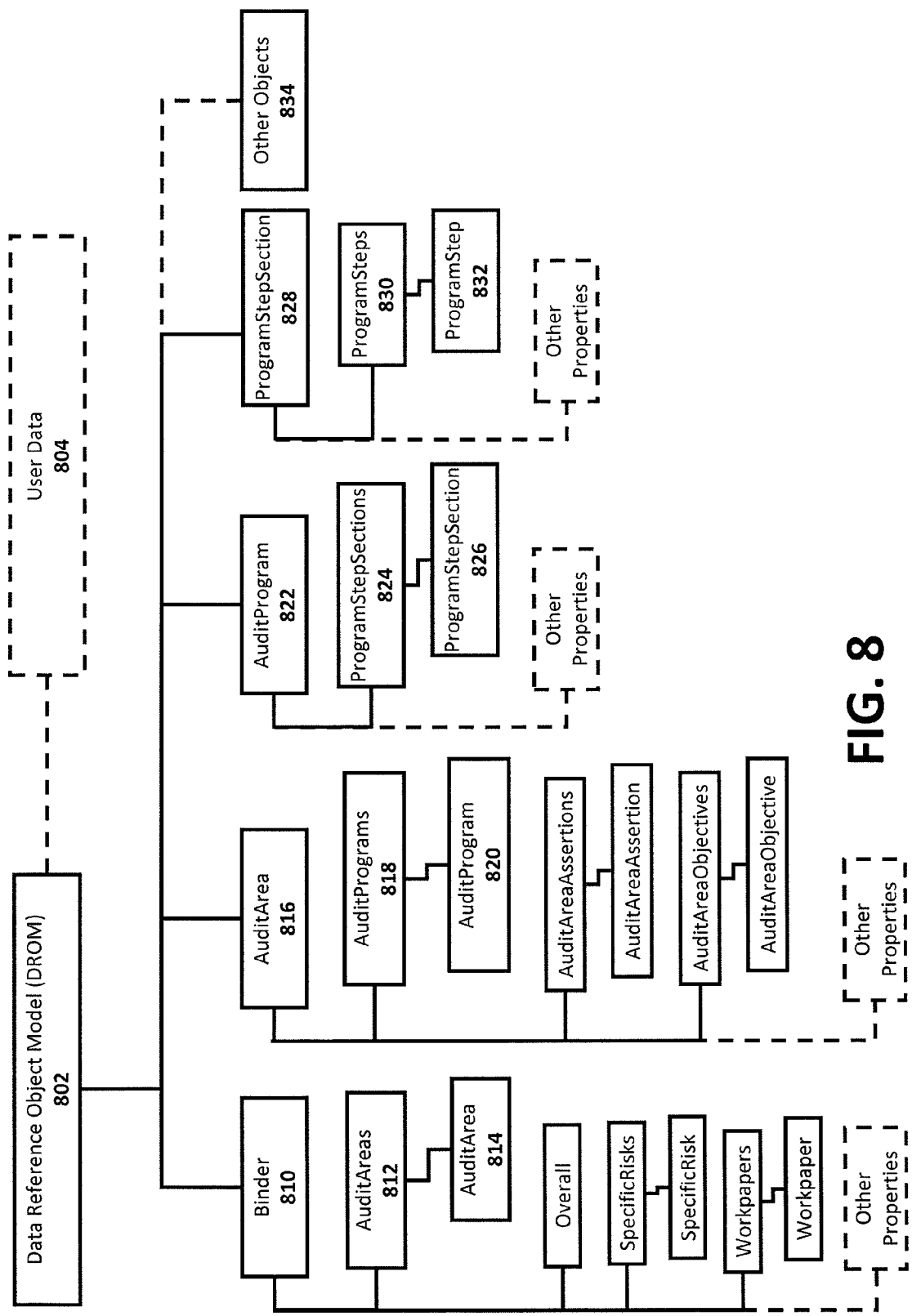
FIG. 8 illustrates an exemplary data reference object model.

The data reference object model ("DROM") consists of objects and properties through which content elements and user data are "bound" to the presentation layer in Knowledge Coach. For example, the DROM is used in data reference expressions to bind rules to the underlying data and in table definitions to bind cells to the underlying user data. An exemplar of a DROM is excerpted in FIG. 8. User data 804 may be coupled with the KC data reference object model 802 that contains a number of objects, such as Binder objects 810, Audit Area objects 816, Audit Program objects 822 and Program Step Section objects 828. One of the properties of a Binder object 810 is AuditAreas 812, a collection of AuditArea objects 814. Meanwhile, one of the properties of an AuditArea object 816 is Audit Programs 818, a collection of AuditProgram objects 820. Audit Program 822 contains a number of underlying Step Section 824, 826 while Program Step Section 828 may contain Program Steps 830, 832. Other objects 834 and other properties may be defined as needed to support the necessary user data.

Figure 9:
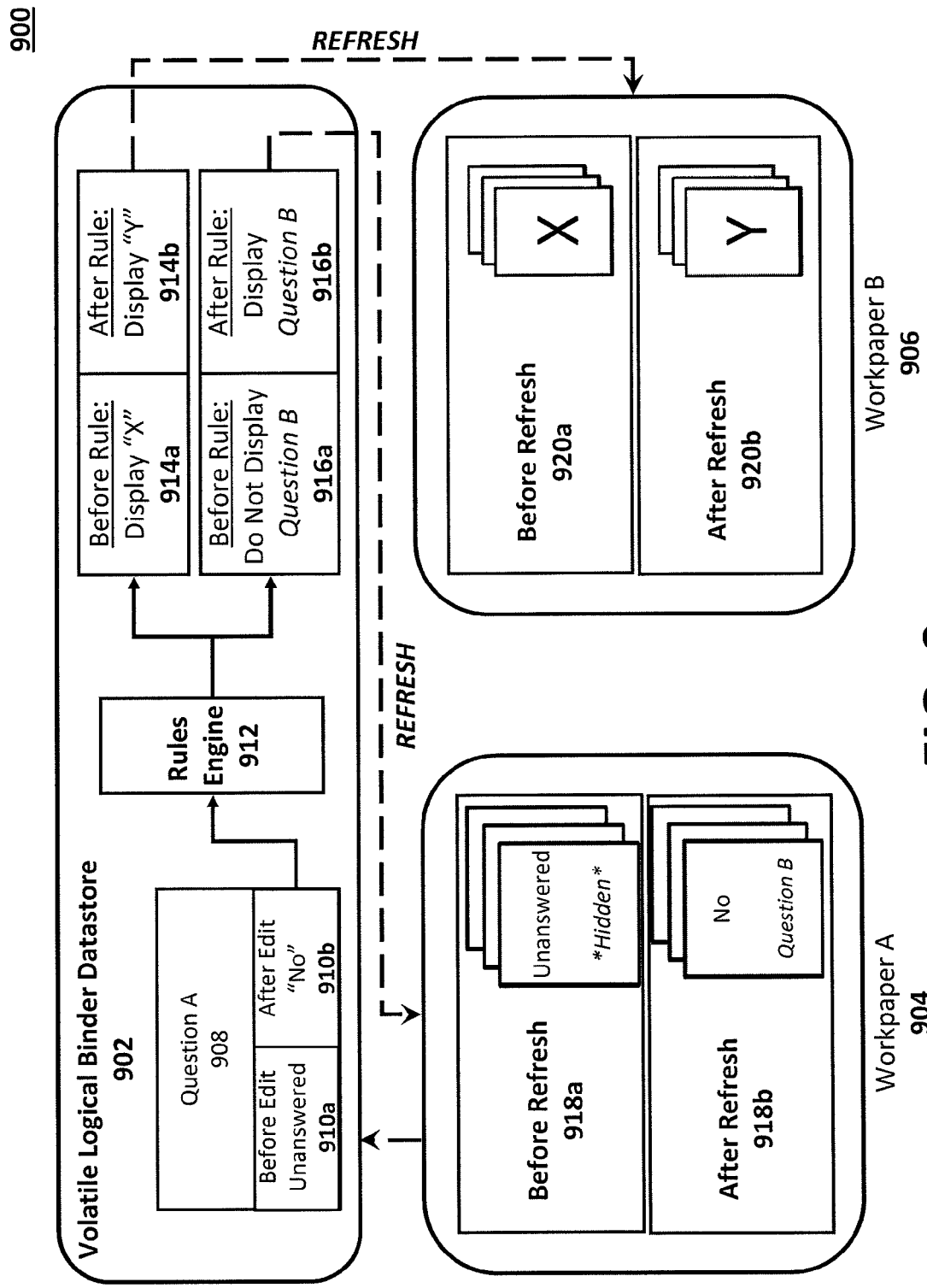
FIG. 9 illustrates an exemplary dynamic tailoring process.

An exemplary dynamic tailoring process 900 is detailed in FIG. 9. Once the workpapers are in a binder and are being used in run time, the Knowledge Coach workpapers are dynamically tailored based on rules and any data changes and/or additions. The workpapers follow extensive refresh logic to ensure that the workpapers reflect the most recent data and/or changes. For example, in workpaper A 904, if the user changes the answer to one question 908 from "Unanswered" at 910a to "No" at 910b, through data reference binding techniques the new answer immediately flows into the "volatile" (unsaved) logical binder datastore 902. The change to the data can trigger one or more rules, such as, for example (i) a rule for the visibility of another question (e.g., Question B 916a, 916b) within workpaper A 904, 918a, 918b; and (ii) a rule for a program step in workpaper B 906 (e.g., as illustrated in the workpapers 920a, 920b, rather than X being displayed, Y is displayed 914a, 914b). The one or more rules may be implemented via rules engine 912. Since workpaper A is the active workpaper, it is automatically and immediately refreshed. However, for this example, workpaper B 906 is not an active workpaper, thus it may not refresh unless there is (i) an automatic required trigger (such as opening the workpaper if it is currently closed); (ii) an automatic optional trigger; and (iii) a manual trigger (clicking on the "Refresh" button).

For instance, if a user is asked to input data, the output may be dependent upon the type of inputted data: output A would be produced if a certain data field reads "True," but output B would be produced if the same data field reads "False." The same methodology could be applied to instances where a particular threshold must be met in order to yield a particular output. For instance, a certain text field may be inapplicable if the value of a certain data field is less than X. Thus, Knowledge Coach would keep the text field hidden until the value of the data field has met or exceeded X.

Figure 10:
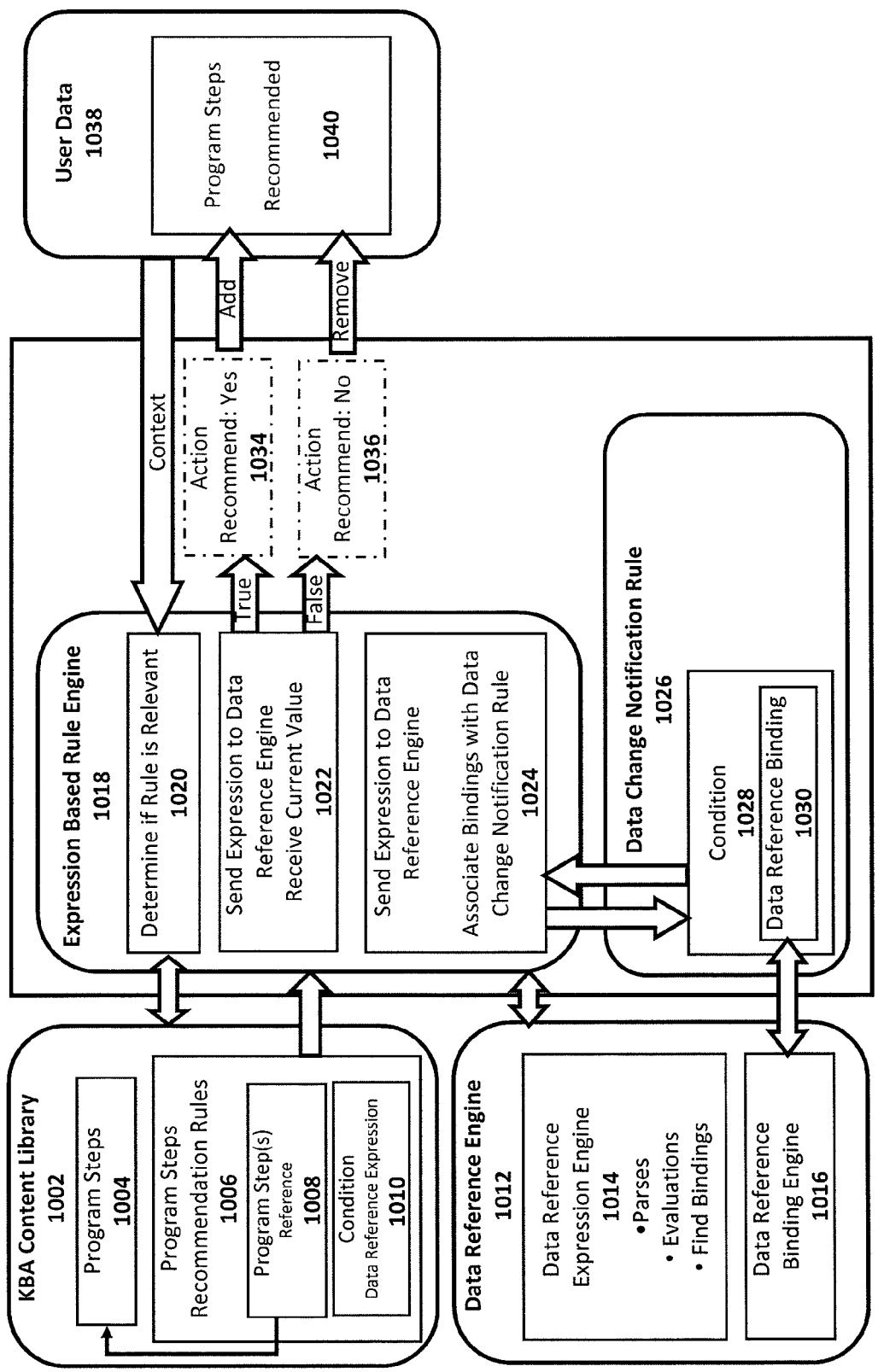
FIG. 10 illustrates an exemplary system for interfacing a KBA content library to program step recommendations.

The complexity of interrelationships between rules, content elements and user data can be minimized by decoupling the original source of the data from the accessing of that data by the data-driven rules. Referring now to FIG. 10, an exemplary system for interfacing a KBA content library 1002 with program step recommendations 1040 via a rules engine 1018 and a data reference engine 1012 is illustrated. As shown in FIG. 10, rather than the program steps relating directly to the tailoring questions, the relationship is indirect: (i) program steps 1008 (KBA content library 1002) and conditions 1010 are associated with program step recommendation rules 1006; (ii) program step recommendation rules 1006 (KBA content library 1002) are processed by rules engine 1018; (iii) rules engine 1-18 requests evaluation of expressions by data reference engine 1012; (iv) current value 1022 is returned by data reference engine 1012 to rules engine 1018, which may be checked for relevancy at step 1020; (v) those same expressions are also associated with data change notification rules 1026, which have conditions 1028 and are bound to data references 1024 through the data reference binding engine 1016 and expression engine 1014; (vi) the result of the rule engine is a "Yes" 1034 or "No" 1036 state for whether a particular program step is recommended, which in turn determines whether or not that program step belongs to the program step's recommended 1040 collection in the user data 1038.

Figure 11A:
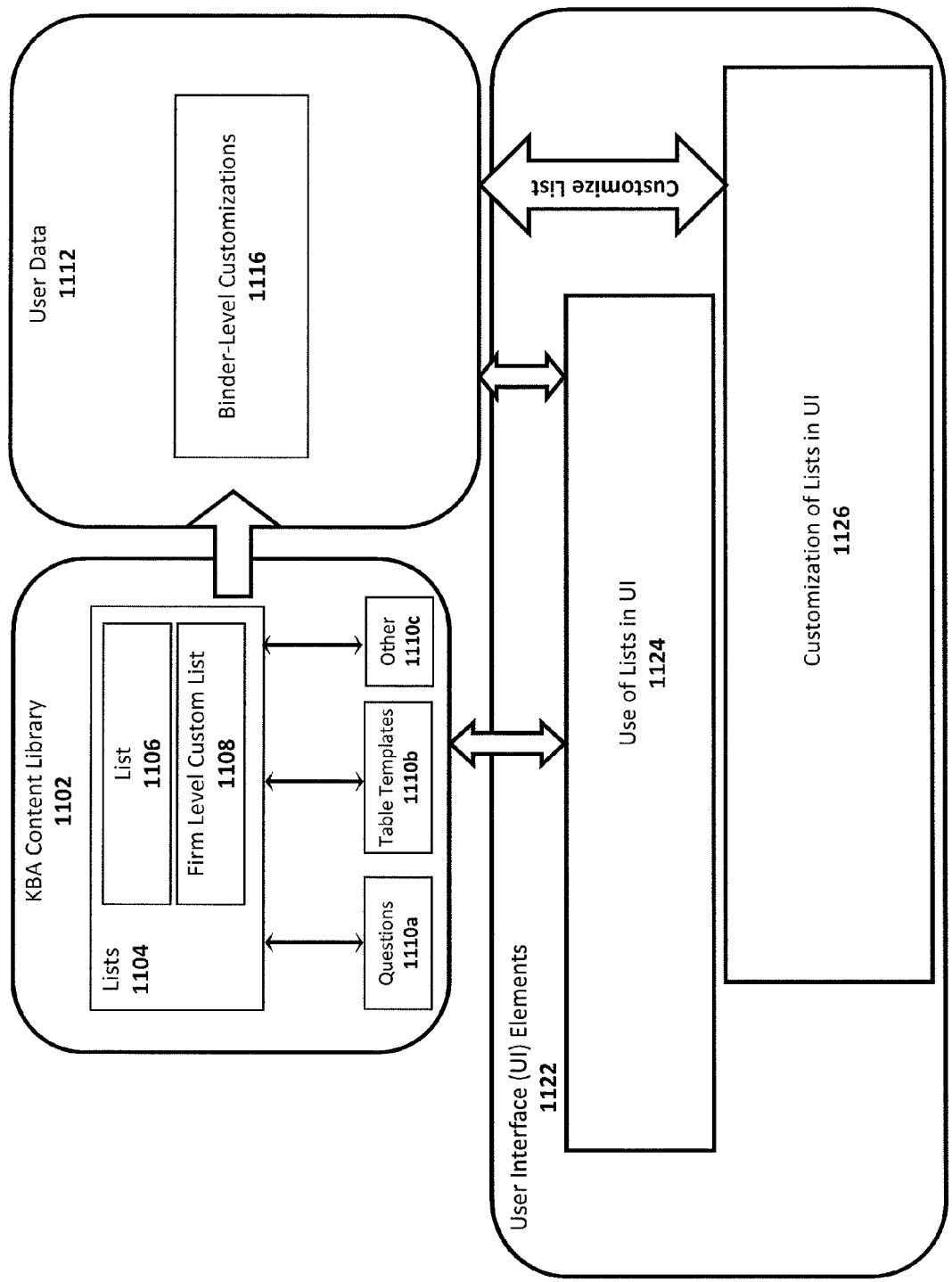
FIGS. 11a-11c illustrate a block diagram illustrating an exemplary system enabled for customization of lists.
Figure 11B:
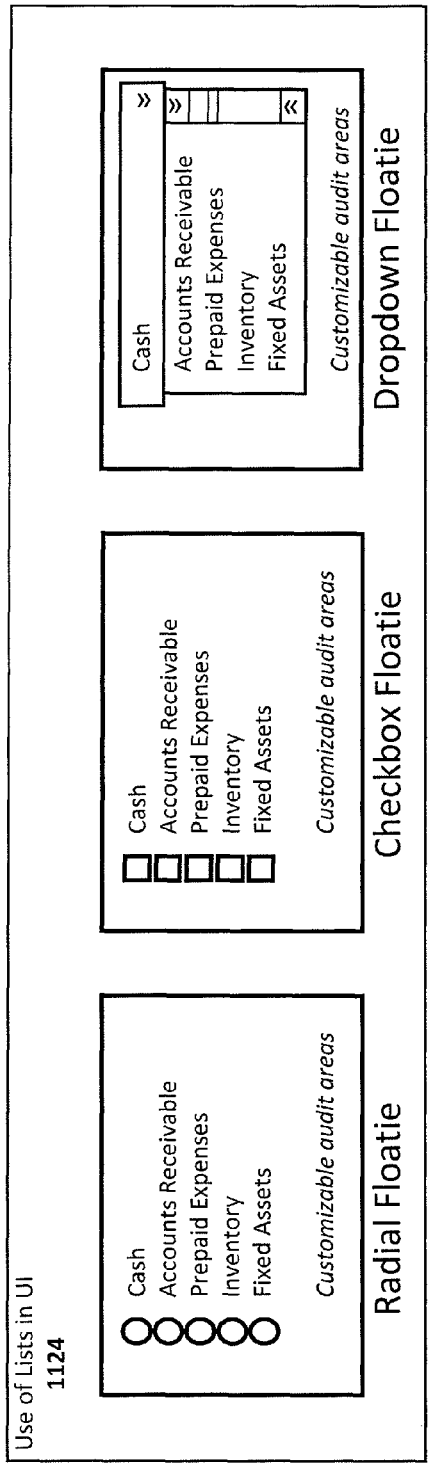
Figure 11C:
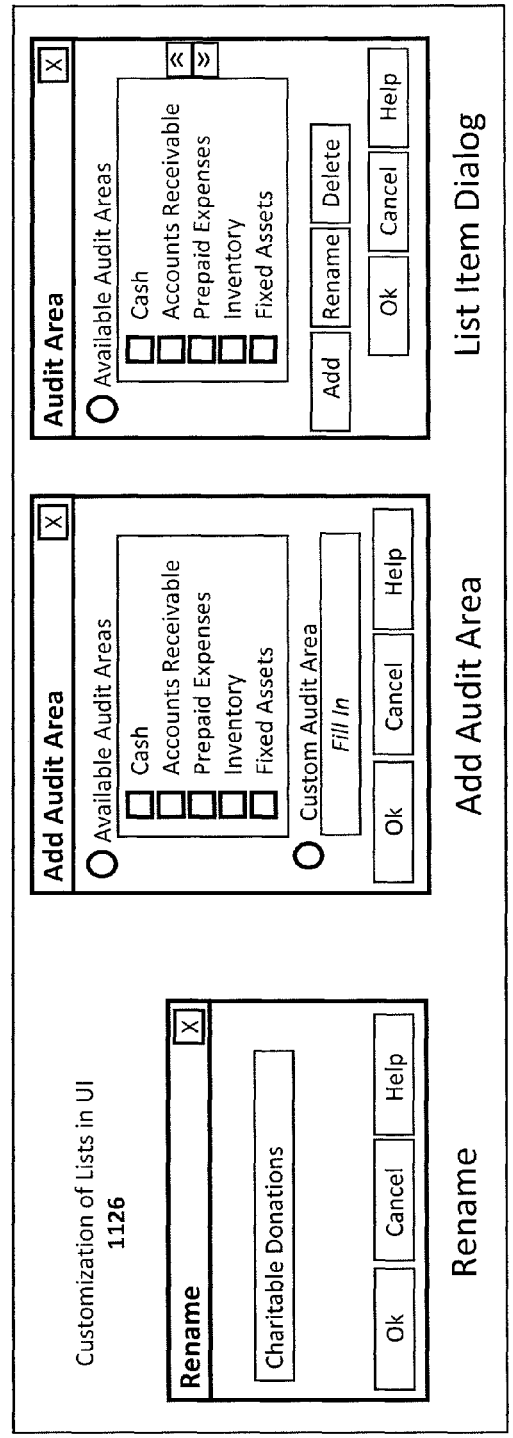

The system disclosed herein further provides for a customization of lists, as demonstrated by FIGS. 11a-11c. Inside the KBA content library 1102, one type of knowledge element is lists 1104, which are associated, for instance, with questions 1110a, table templates 1110b and/or other factors 1110c. Lists 1106 may be published by a KBA system provider, but these lists may be also customized by users into custom lists as either firm-level customized lists 1108 or binder-level customized lists 1116 within user data 1112. The lists appear in the user interface 1122 to be used (Use of Lists in UI 1124) or to be customized (Customization of Lists in UI 1126).

Figure 12:
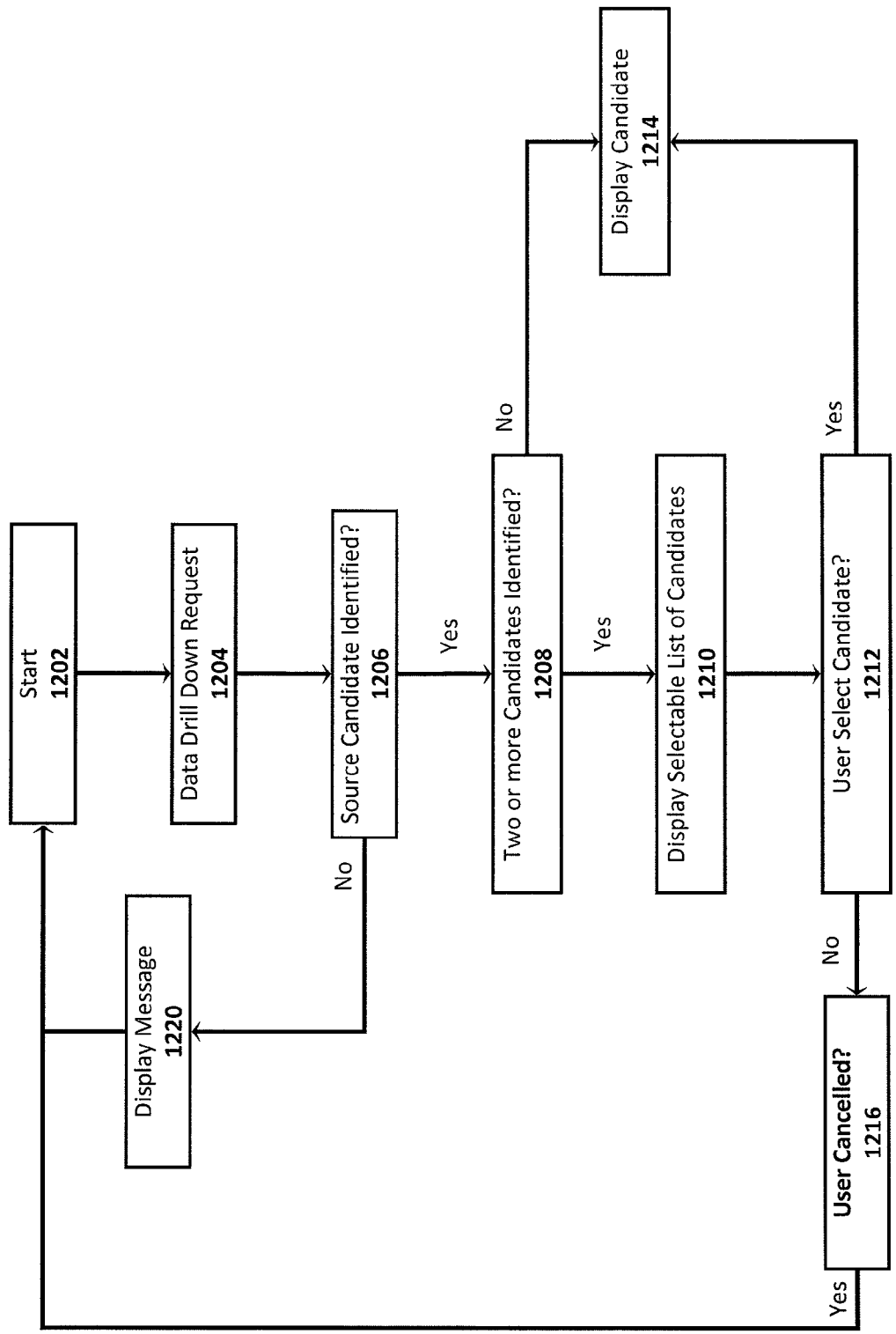
FIG. 12 illustrates an exemplary drilling-down process.

The disclosed system also provides the ability to "drill down." The term "drill down" may be defined as the ability to bring focus to the source of the information displayed by clicking an icon or other indicator (e.g., a triangle). As an example, from a target cell, a user can click a triangle (e.g., using GUI) to bring focus (e.g., obtain the document details or view the actual source) to the source cell that populated the target cell. The system may achieve this function through dynamic run-time evaluation of drill-down properties that may be established when table templates are tagged, and through those drill-down properties, determine the appropriate target(s). As detailed in FIG. 12, after system start-up 1202 (e.g., launching Knowledge Coach), prompting the drill-down function at step 1204 (e.g., selecting the icon to trigger a drill-down operation) will typically yield one of three possible outcomes regarding the number of target candidates that are identified by the system. The first outcome is a case where there are zero target candidates (e.g., source documents). When the system finds no target candidates at step 1206, the system cannot drill down. Depending on the design-specific scenario, this might result in no action being taken, might result in a message box at 1220 (e.g., to notify the user that there are no candidates), or might result in some other action (e.g., the instance being recorded to a file). Alternatively, exactly one target candidate may be returned at step 1208. In a case where the system finds exactly one target candidate, that one target candidate would be the automatic "winner." Depending on the design-specific scenario, the Knowledge Coach system will either navigate directly to the winner target candidate at step 1214 (e.g., this may occur if the winner target candidate is within the same worksheet) and/or issue a warning (e.g., if the winner target candidate workpaper is not currently open, or is part of a different worksheet). Finally, more than one target candidate may be returned at step 1208. When the system finds more than one target candidate, a dialog box may be presented to the user at step 1210 that permits the user to choose one or more candidates or to cancel the operation at step 1216. If the user selects a candidate at step 1212, the candidate may be displayed at step 1214.

Figure 13:
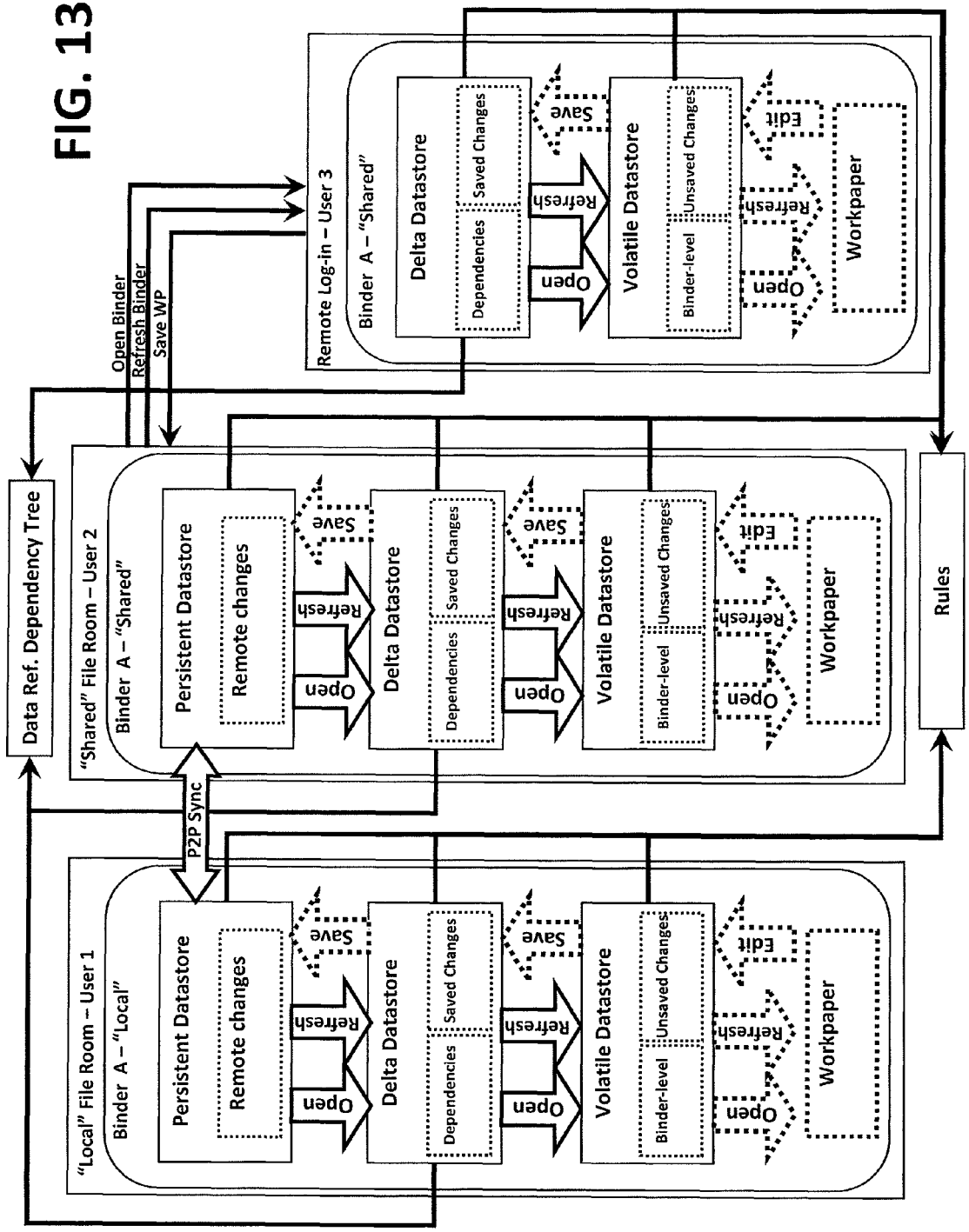
FIG. 13 illustrates an exemplary document management system enabled for use with Knowledge Coach.

With regard to binder datastores, Content and user-input values may be stored for each binder separately in the binder datastore, which preferably has three logical partitions: "persistent" (or saved), "volatile" (or unsaved) and "delta" (changes since the last refresh from persistent to volatile or since the last "save" from volatile to persistent). The diagram of FIG. 13 depicts how user-made changes flow across these three partitions within the context of a document management system. An exemplary document management system that may be used in conjunction with the present invent includes, for example, ProSystem Engagement. As illustrated in FIG. 13, changes may pass though the volatile datastore, move through the delta datastore, and finally be committed to the persistent datastore. The way this data is stored facilitates the sharing of binder content among multiple users who are working on an Engagement binder together.

Figure 15A:
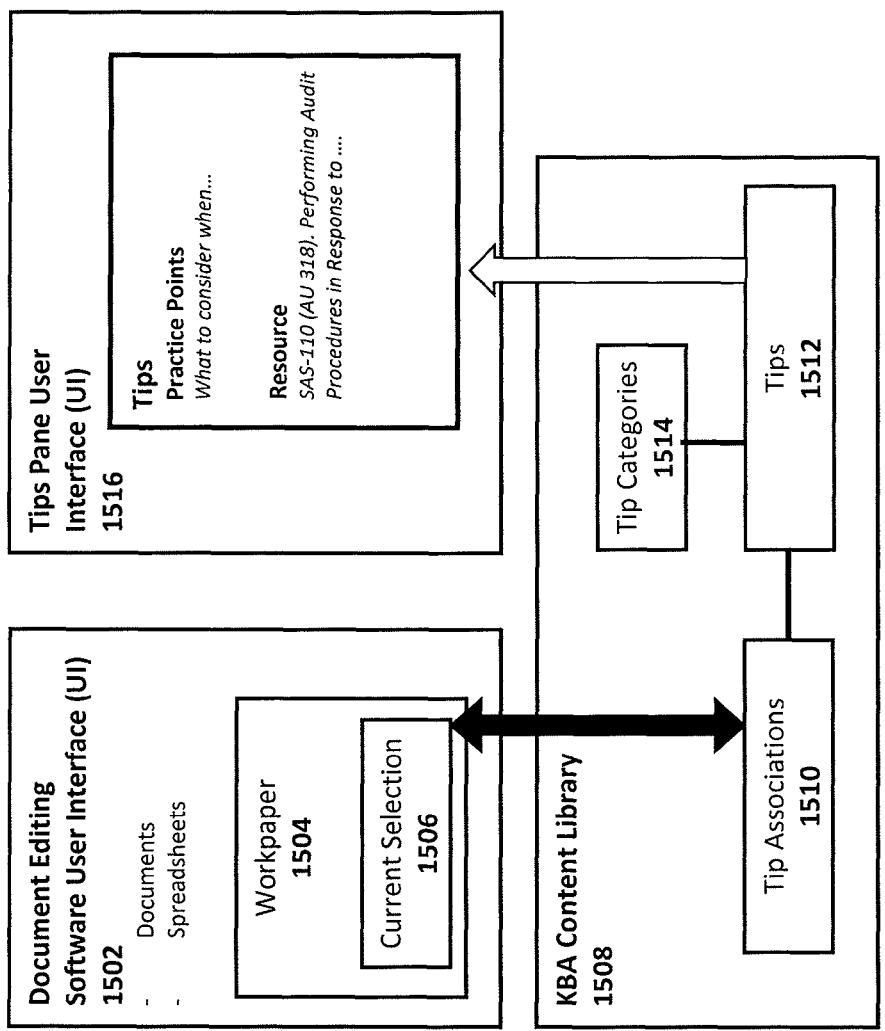
Figure 15B:
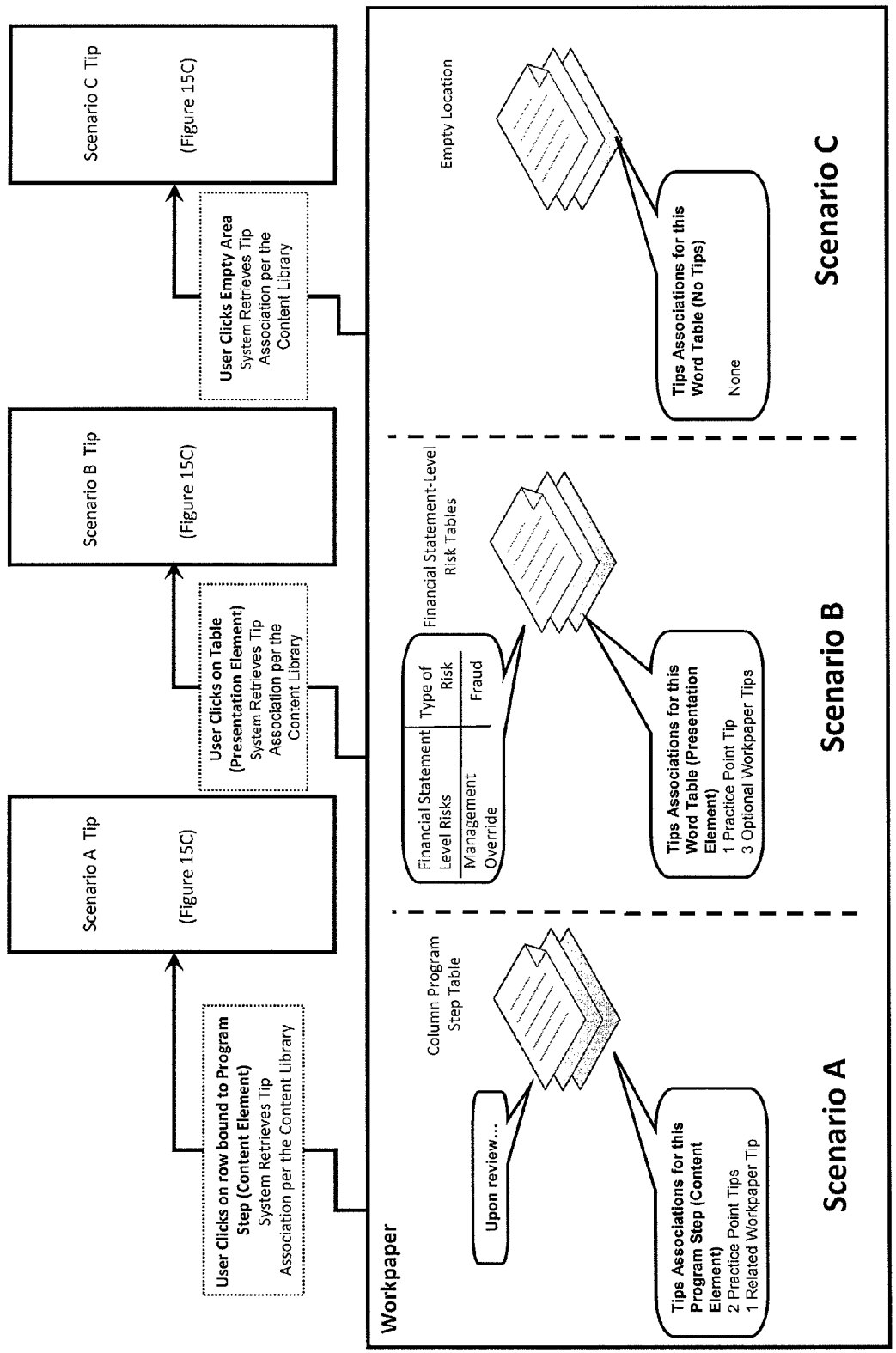

Additional guidance, beyond the content provided in the actual Knowledge Coach workpaper body, may be delivered via tip functionality, which may address a number of topics such as practice points, related workpapers, resources, examples, tips for using Knowledge Coach, etc. Tips are another form of knowledge content managed within the content library and may be distributed in content packages. As shown in FIGS. 15*a* and 15*b*, tip functionality may provide the user with additional guidance, in the form of tips, based on the context of the current selection within a workpaper. Within the KBA content library 1508, each tip 1512 may be assigned, via tip associations 1510, to a tip category 1514 such that a tip cannot belong to more than one category. Based on the user's currently selected range 1506 in the workpaper 1504 that is being edited in the document editing software 1502, the tips pane 1516 updates dynamically to show the tips that are relevant to that selection. Categories containing no tips for the currently selected range in the workpaper are not displayed. The tips pane 1516 may be hosted within a generic, dockable container pane provided by word processing or spreadsheet software, including, for example, Microsoft® Word or Excel®. In certain embodiments, the tips pane may remember user settings upon reopening, and be displayed or turned off accordingly.

FIGS. 15*b* and 15*c* illustrate some exemplary scenarios for associations between the current selection and the tips which are displayed. In the first scenario, the user clicks on a row in a table; two tips are displayed from the tip category for practice points, and one tip is displayed from the tip category for related workpapers. In the second scenario, the user clicks on a table; one tip is displayed from the tip category for practice points, and three tips are displayed from the tip category for optional workpapers. In the third scenario, the user clicks on an area of the document associated with no tips; no tips are displayed.

Figure 15D:
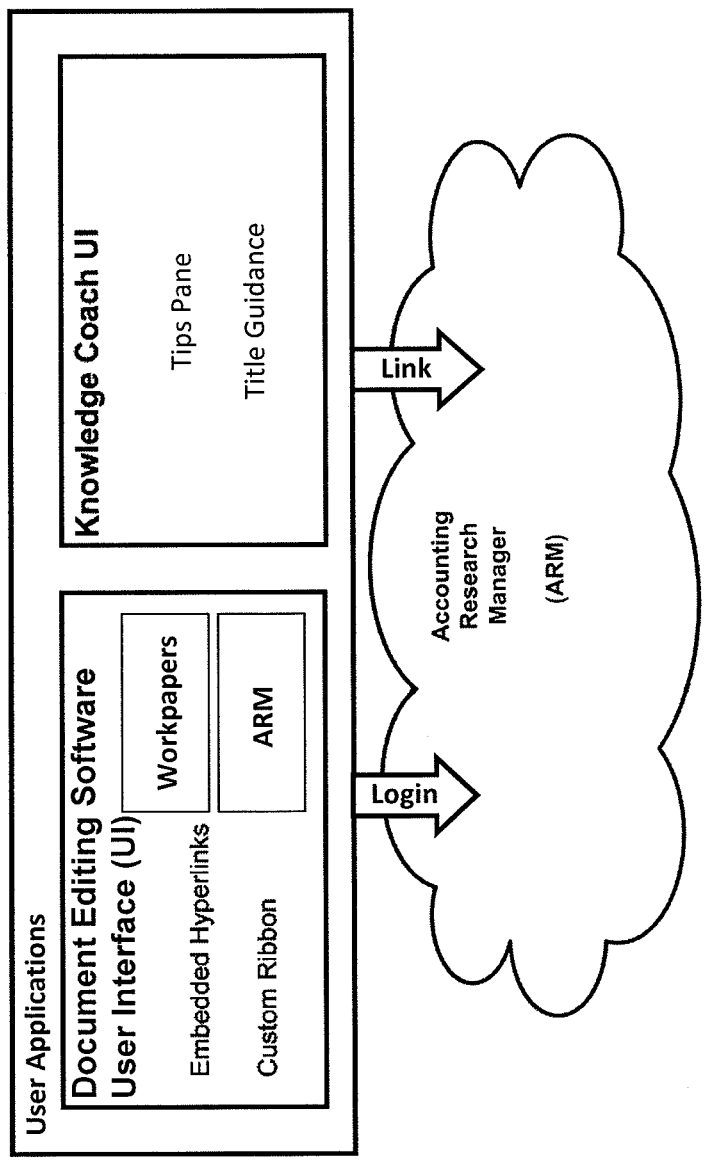

The Knowledge Coach system may also provide links to research material located on the Internet. For instance, FIG. 15*d* shows that the Knowledge Coach system may provide HTML links to resource content on an Accountants Research Manager (ARM) in workpapers. Users may click on the links and the Knowledge Coach system will automatically use their login credentials to sign into ARM and launch the specified Web pages. In this situation, the administrator or user may record the user name and password for the various research Web sites in the user's profile. When the user launches one of the research Web sites, the system may automatically log the user into the applicable site when log-in details have been provided, and the user can then navigate through the content.

Figure 14:
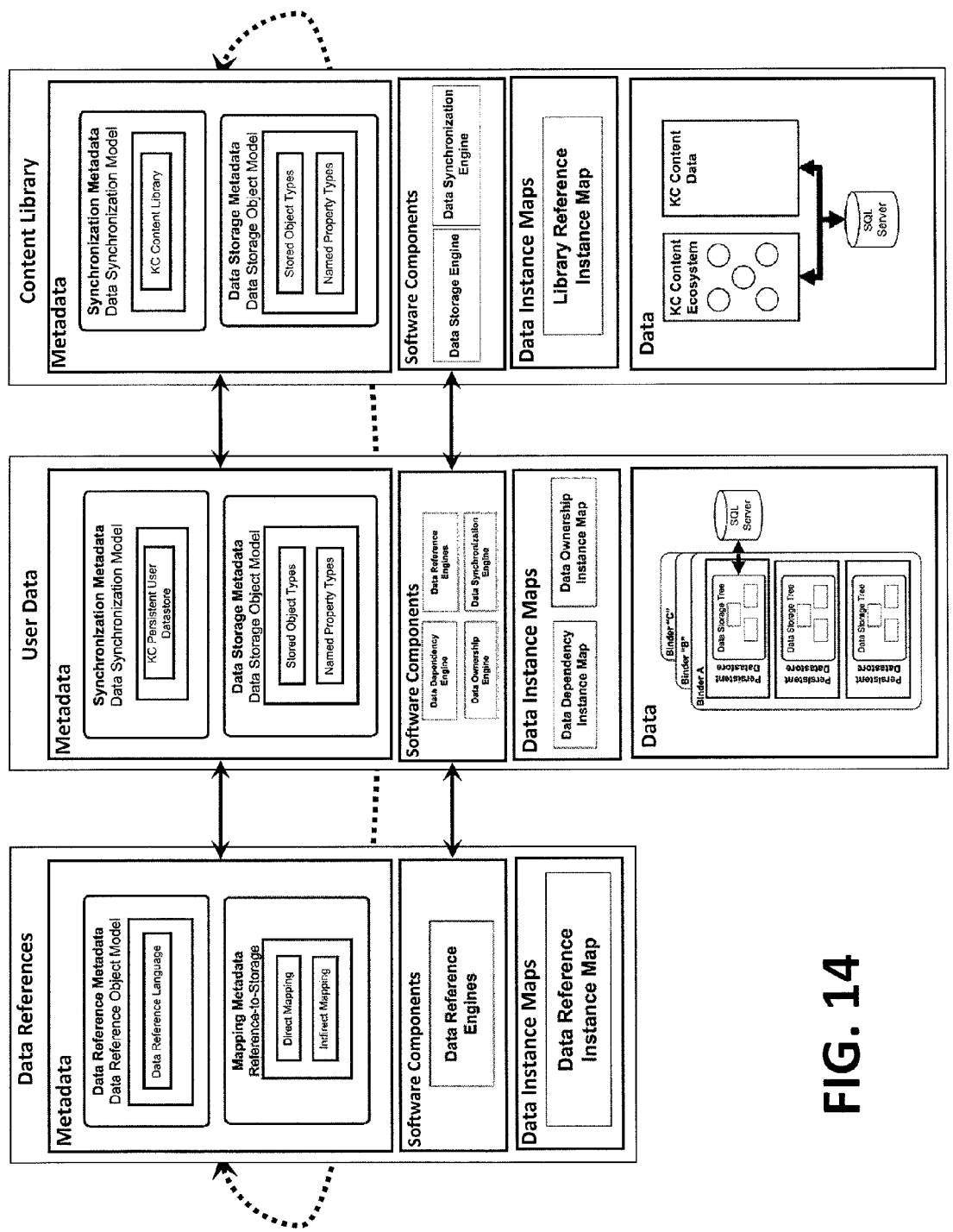
FIG. 14 illustrates an exemplary Knowledge Coach system architecture.

With regard to the runtime data architecture, the basic principles of the Knowledge Coach run-time data architecture may include (i) loosely coupled subsystems, (ii) data reference object model ("DROM"), (iii) data storage object model ("DSOM"), (iv) reference-to-storage mapping, (v) Knowledge Coach user datastore, (vi) Knowledge Coach content library, and (vii) data identifiers. Loosely coupled subsystems may encompass, for example, (a) Data such as user data (e.g., binders, workpapers, answers, signoffs, etc.) and content data (e.g., titles, workpaper definitions, program steps, questions, rules, etc.); (b) Metadata that may be used to describe structures, relationships, constraints and behaviors through configurable text and can consist of object models, mappings, synchronization models, etc.; and (c) Code that may be combined with metadata and data to yield data modifications, data consumers, workpapers, tables, rules, diagnostics, content updates, workpaper management, etc. Data reference object model may be used to provide data consumers with access to data as described by metadata and/or implemented in metadata-driven code. DROM is typically non-hierarchical (e.g., there are multiple paths to entities) and may be accessed through a data reference language with binding and expressions. Data storage object model controls data storage as described by metadata and/or implemented in metadata-driven code. Unlike DROM, DSOM is typically hierarchical (e.g., a tree with single paths to entities). Reference-to-Storage Mapping may be used to connect DROM and DSOM as described by metadata and/or implemented in metadata-driven code and is usually direct mapping but occasionally indirect through custom functions. Knowledge Coach user datastore may utilize generic storage, dynamically integrated with dynamically determined entities and instance counts. The design should accommodate any storage model which meets the system constraints, including storage models which have not yet been published. Knowledge Coach content library requires creating versions with associated updates, conversions, and constraints. Data identifiers in content data must be consistent enough for "plug-and-play" of corresponding content across titles and title versions. An exemplary illustration of the system run-time architecture is detailed in FIG. 14.

Figure 16:
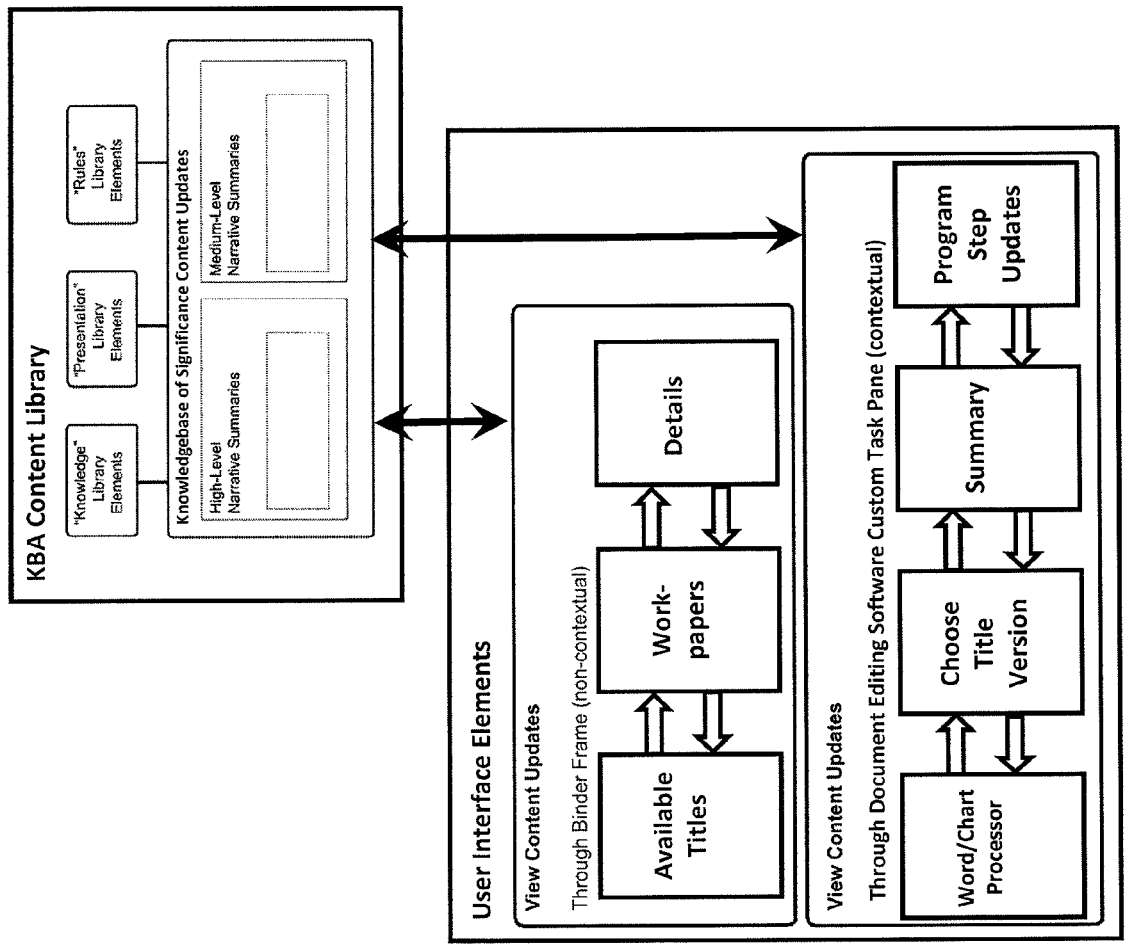
FIGS. 16-17 illustrates a system for continually updating content delivered via Knowledge Coach and viewing information about those updates.

Under a preferred embodiment, the content that is delivered via Knowledge Coach is continually subject to updates. Under a preferred embodiment, the updates may be provided approximately one per year. The structure of the data and presentation layers allows for the data to be updated and for the user to see the changes from year to year. An exemplary manner in which the updating occurs is detailed in FIG. 16. The Knowledge Coach system may provide the user with a number of options when viewing versions. The options include, for example, the ability to choose a version of the template the user wishes to review; display a summary list of template updates alongside the workpaper; allow the user to view template updates to any workpaper in any title from the binder frame; and allow the user to continue to edit the workpaper while viewing the updates. For instance, when a user first opens the dialog and has not yet selected a template version to review, a title summary may be displayed with available template versions by title. Once the user has selected a title version, the workpaper templates may be organized by template type. When a workpaper template is selected, the updated information may be displayed. When viewing a workpaper, a user may select the option to view updates from the menu, and a list of available template versions may be displayed in the task pane alongside the workpaper. Once a template version is selected, the summary (description) of changes is displayed in the task pane. The user may continue to edit the workpaper while viewing the changes.

Figure 17:
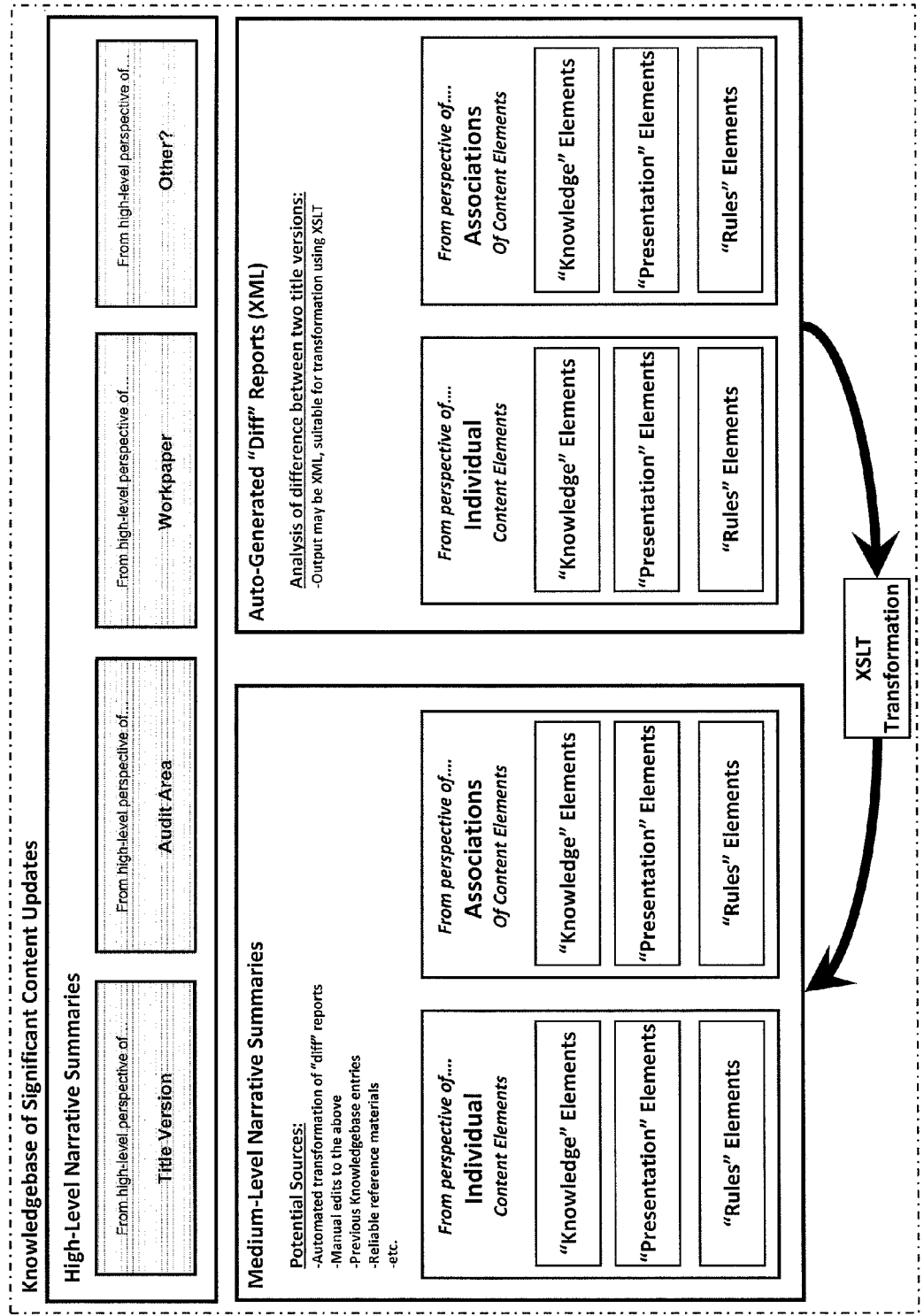

An exemplary manner in which the knowledge base of significant content updates occurs is further illustrated in FIG. 17. When template updates occur, users often require the ability to review changes to the templates so that they can assess any additional work that will need to be completed.

Thus, what have been described are presently preferred embodiments of an invention for providing easy and effective risk-based auditing. While the description so far has centered on risk-based auditing, it is clear to those of skill in the art that the Knowledge Coach system can equally be applied to other information management systems to provide a system. For example, the rule based methods used to implement the Knowledge Coach system may be readily used to create a system for automatically generating other documents, including, for example, legal documents, medical documents, and business documents.

The above-cited patents and patent publications are hereby incorporated by reference in their entirety herein. Although various embodiments of the present invention have been described with reference to a particular arrangement of parts, features and the like, these are not intended to exhaust all possible arrangements or features, and indeed many other embodiments, modifications and variations will be ascertainable to those of skill in the art, and indeed many other embodiments, modifications and variations will be ascertainable to those of skill in the art. Thus, it is to be understood that the invention may therefore be practiced otherwise than as specifically described above.

What is claimed is:

1. A computer system for distributing content pursuant to an audit-based process, comprising:
 a content library database on one or more computer-readable media;
 a communication device operatively coupled to the content library database to receive annotated documents containing industry-specific content; and
 at least one processor, operatively coupled to the communication device for
 (i) receiving, using one or more computers, annotated documents containing industry-specific content;
 (ii) decomposing, using said one or more computers, the annotated documents into a plurality of individual content elements,
  wherein said plurality of individual content elements are stored to the content library database,
  wherein said plurality of individual content elements include knowledge and presentation elements,
  wherein the presentation elements define a workpaper skeleton;
 (iii) identifying, using said one or more computers, individual content elements that are related to one another based upon one or more pre-determined criteria;
 (iv) merging said individual content elements that are related to one another into content packages; and
 (v) using one or more computers to dynamically generate a dynamic workpaper,
  wherein the dynamic workpaper is generated using data associated with a content package in accordance with at least one predetermined rule,
  wherein the dynamic workpaper is dynamically updated in response to
   (i) changes to presentation elements, or
   (ii) changes to knowledge elements.

2. The computer system of claim 1, wherein the industry-specific content is authored by experts in the field of audit-based processes.

3. The computer system of claim 1, wherein the dynamic workpaper comprises: (i) text; (ii) a chart; (iii) a table; (iv) a graphic image; or (v) combinations thereof.

4. The computer system of claim 1, wherein the dynamic workpaper is dynamically updated in response to new or amended predetermined rules.

5. The computer system of claim 1, further comprising the step of posing a question to a user wherein the user provides an answer, wherein data associated with the answer is used to generate the dynamic workpaper.

6. The computer system of claim 1, wherein edits made to a first section of the dynamic workpaper are used to dynamically update a second section of the dynamic workpaper.

7. The computer system of claim 1, wherein the dynamic workpaper provides drilldown functionality for enabling a user to view a source for a specified data value that has flowed into the dynamic workpaper.

8. The computer system of claim 1, wherein the dynamic workpaper enables tip functionality to provide a user with additional guidance based on the status and data associated with the dynamic workpaper.

9. The computer system of claim 8, wherein the tip functionality is triggered by selecting an icon embedded within the dynamic workpaper to provide information related to one or more topics chosen from a group consisting of: (i) practice points; (ii) related workpapers; (iii) resources; (iv) examples; (v) user assistance; and (vi) combinations thereof.

10. The computer system of claim 8, wherein the dynamic workpaper includes functionality enabling a user to access a web-based research system by selecting a hyperlink embedded within either the dynamic workpaper or the related tips.

11. A computer-implemented method for distributing content pursuant to an audit-based process, comprising:
 receiving, using one or more computers, annotated documents containing industry-specific content;
 decomposing, using said one or more computers, the annotated documents into a plurality of individual content elements,
  wherein said plurality of individual content elements are stored to a content library database on one or more computer-readable media,
  wherein said plurality of individual content elements include knowledge and presentation elements,
  wherein the presentation elements define a workpaper skeleton;

identifying, using said one or more computers, individual content elements that are related to one another based upon one or more pre-determined criteria;

merging said individual content elements that are related to one another into content packages; and using one or more computers to dynamically generate a dynamic workpaper,
- wherein the dynamic workpaper is generated using data associated with a content package in accordance with at least one predetermined rule,
- wherein the dynamic workpaper is dynamically updated in response to
  - (i) changes to presentation elements, or
  - (ii) changes to knowledge elements.

12. The computer-implemented method of claim 11, wherein the industry-specific content is authored by experts in the field of audit-based processes.

13. The computer-implemented method of claim 11, wherein the dynamic workpaper comprises: (i) text; (ii) a chart; (iii) a table; (iv) a graphic image; or (v) combinations thereof.

14. The computer-implemented method of claim 11, wherein the dynamic workpaper is dynamically updated in response to new or amended predetermined rules.

15. The computer-implemented method of claim 11, further comprising the step of posing a question to a user wherein the user provides an answer, wherein data associated with the answer is used to generate the dynamic workpaper.

16. The computer-implemented method of claim 11, wherein edits made to a first section of the dynamic workpaper are used to dynamically update a second section of the dynamic workpaper.

17. The computer-implemented method of claim 11, wherein the dynamic workpaper provides drilldown functionality for enabling a user to view a source for a specified data value that has flowed into the dynamic workpaper.

18. The computer-implemented method of claim 11, wherein the dynamic workpaper enables tip functionality to provide a user with additional guidance based on the status and data associated with the dynamic workpaper, wherein the tip functionality is triggered by selecting an icon embedded within the dynamic workpaper to provide information related to one or more topics chosen from a group consisting of: (i) practice points; (ii) related workpapers; (iii) resources; (iv) examples; (v) user assistance; and (vi) combinations thereof.

19. The computer-implemented method of claim 18, wherein the dynamic workpaper includes functionality enabling a user to access a web-based research system by selecting a hyperlink embedded within either the dynamic workpaper or the related tips.

20. A computer system for distributing content pursuant to an audit-based process, comprising:
- a content library database on one or more computer-readable media;
- a communication device operatively coupled to the content library database to receive annotated documents containing industry-specific content; and
- at least one processor, operatively coupled to the communication device for
  - (i) receiving, using one or more computers, annotated documents containing industry-specific content;
  - (ii) decomposing, using said one or more computers, the annotated documents into a plurality of individual content elements,
    - wherein said plurality of individual content elements are stored to the content library database,
    - wherein said plurality of individual content elements include knowledge and presentation elements,
    - wherein the presentation elements define a workpaper skeleton,
    - wherein the knowledge elements define data values suitable for inclusion within a dynamically generated audit workpaper;
  - (iii) identifying, using said one or more computers, individual content elements that are related to one another based upon one or more pre-determined criteria;
  - (iv) posing a question to a user wherein the user provides user-supplied reply data;
  - (v) merging said individual content elements that are related to one another into content packages; and
  - (vi) using one or more computers to dynamically generate a dynamic workpaper,
    - wherein the dynamic workpaper is generated using data associated with a content package in accordance with at least one predetermined rule,
    - wherein the predetermined rule defines custom logic for determining dynamic association of knowledge elements, presentation elements, and user-supplied reply data,
    - wherein the dynamic workpaper is dynamically updated in response to
      - (i) changes to presentation elements, or
      - (ii) changes to knowledge elements.

* * * * *